US 11,748,874 B2

(12) United States Patent
Floeder et al.

(10) Patent No.: US 11,748,874 B2
(45) Date of Patent: Sep. 5, 2023

(54) AUTOMATED INSPECTION FOR SHEET PARTS OF ARBITRARY SHAPE FROM MANUFACTURED FILM

(71) Applicant: 3M INNOVATIVE PROPERTIES COMPANY, St. Paul, MN (US)

(72) Inventors: Steven P. Floeder, Shoreview, MN (US); James A. Masterman, Lake Elmo, MN (US); Xin Yu, Woodbury, MN (US); Nathaniel S. Rowekamp, Inver Grove Heights, MN (US); Jeffrey P. Adolf, Rochester, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 285 days.

(21) Appl. No.: 17/283,611

(22) PCT Filed: Oct. 14, 2019

(86) PCT No.: PCT/IB2019/058745
§ 371 (c)(1),
(2) Date: Apr. 8, 2021

(87) PCT Pub. No.: WO2020/079567
PCT Pub. Date: Apr. 23, 2020

(65) Prior Publication Data
US 2021/0390676 A1    Dec. 16, 2021

Related U.S. Application Data

(60) Provisional application No. 62/745,619, filed on Oct. 15, 2018.

(51) Int. Cl.
*G06T 7/00* (2017.01)
*G06T 7/13* (2017.01)
(Continued)

(52) U.S. Cl.
CPC ............ *G06T 7/001* (2013.01); *G06T 3/0006* (2013.01); *G06T 3/60* (2013.01); *G06T 7/13* (2017.01);
(Continued)

(58) Field of Classification Search
CPC ......... G06T 7/001; G06T 3/0006; G06T 3/60; G06T 7/13; G06T 2200/24; G06T 2207/30124; G06T 7/337; G06T 7/0004
See application file for complete search history.

(56) References Cited

U.S. PATENT DOCUMENTS 5,474,248 A    12/1995  Bradshaw
6,289,117 B1    9/2001  Li
(Continued)

FOREIGN PATENT DOCUMENTS

WO    WO 2020-079568    4/2020

OTHER PUBLICATIONS

"Advanced Winder Advisor (AWA)", Cognex Corporation, pp. 1-17.
(Continued)

*Primary Examiner* — Charles T Shedrick
(74) *Attorney, Agent, or Firm* — Philip P. Soo

(57) ABSTRACT

An example system is described herein. The example system may include an inspection device comprising at least one image capture device, the at least one image capture device configured to capture a reference image of a sheet part. Additionally, the example system may include a processing unit configured to identify at least one primary point in the reference image and identify at least one secondary point in a mask image. The processing unit may transform the mask image based on the at least one primary point and the at least one secondary point. The processing unit may apply the transformed mask image to the reference image to identify (Continued)

an inspection region within the reference image, process the inspection region of the reference image to determine the quality of the sheet part, and output information indicative of the quality of the sheet part.

20 Claims, 8 Drawing Sheets

(51) Int. Cl.
*G06T 3/00* (2006.01)
*G06T 3/60* (2006.01)
(52) U.S. Cl.
CPC ..... *G06T 2200/24* (2013.01); *G06T 2207/30124* (2013.01)

(56) References Cited

U.S. PATENT DOCUMENTS

| | | | |
|---|---|---|---|
| 6,934,028 | B2 | 8/2005 | Ho |
| 7,027,934 | B2 | 4/2006 | Skeps |
| 7,297,969 | B1 | 11/2007 | Wolinsky |
| 7,333,650 | B2 | 2/2008 | Yamamoto |
| 8,103,085 | B1 | 1/2012 | Zadeh |
| 8,175,739 | B2 | 5/2012 | Floeder |
| 8,935,104 | B2 | 1/2015 | Floeder |
| 8,971,663 | B2 | 3/2015 | Jacobson |
| 9,779,296 | B1* | 10/2017 | Ma ............................. G06T 7/11 |
| 11,587,225 | B2* | 2/2023 | Dou ......................... G06V 10/82 |
| 2005/0206753 | A1 | 9/2005 | Sakurai |
| 2006/0251320 | A1* | 11/2006 | Diederichs ........... H04N 1/6033 |
| | | | 382/165 |
| 2013/0148987 | A1 | 6/2013 | Arakawa |
| 2018/0114306 | A1* | 4/2018 | Ogawa ................... G02B 27/10 |
| 2018/0232873 | A1* | 8/2018 | Inoue ...................... G06T 7/001 |
| 2018/0238816 | A1* | 8/2018 | Sousa ..................... G06T 7/001 |
| 2019/0147586 | A1* | 5/2019 | Ikeda .................... G06T 7/0004 |
| | | | 382/157 |
| 2019/0304077 | A1* | 10/2019 | Wang ........................ G06T 7/13 |
| 2019/0362928 | A1* | 11/2019 | Inoue .................... H01J 37/141 |
| 2020/0089131 | A1* | 3/2020 | Kameishi ............ G03F 7/70641 |
| 2020/0104980 | A1* | 4/2020 | Inoue ........................ G06T 3/60 |
| 2022/0230301 | A1* | 7/2022 | Thomasset ........... G06T 7/0004 |
| 2023/0051895 | A1* | 2/2023 | Winfree ................... B32B 3/18 |

OTHER PUBLICATIONS

"Paper Surface Inspection", Smartview Paper®, Cognex Corporation, On-Line Detection, Identification, and Visualization of Paper Defects, 2009, pp. 1-6.
"Rewind Manager: Maximize Quality, Improve Throughput," ISRA Vision Product Info, [retrieved from the website on Jul. 10, 2018], URL <https://www.isravision.com/media/public/prospekte2011/Flyer_RewindManager_E_2011-09_low.pdf>, 2018, pp. 1-2.
"Ryecos's ROLLSYNC Converting Management System for the Converting Industry," RYECO, vol. 01, 2015, pp. 1-5.
"SMASH Web Inspection Rewinder," Reference Manual Version 3.6.6, ISRA Vision, 2013, pp. 1-144.
Kurosaki, "Advanced Winder Adviser Controlling To A Winder Operation", Japan TAPPI Journal, 2005, vol. 59, No. 10, pp. 1484-1487.
Wolberg, Digital Image Warping, IEEE Computer Society Press Monograph, 1990, pp. 47-71.
International Search Report for PCT International Application No. PCT/IB2019/058745, dated Jan. 13, 2020, 4 pages.

* cited by examiner

AUTOMATED INSPECTION FOR SHEET PARTS OF ARBITRARY SHAPE FROM MANUFACTURED FILM

CROSS REFERENCE TO RELATED APPLICATIONS

This application is a national stage filing under 35 U.S.C. § 371 of PCT/IB2019/058745, filed Oct. 14, 2019, which claims the benefit of Provisional Application No. 62/745,619, filed Oct. 15, 2018, the disclosures of which are incorporated by reference in their entirety herein.

BACKGROUND

Manufacturing processes for making various types of films (e.g., transparent polyester films) involve manufacturing the films in a long continuous sheet, referred to as a web. The web itself is generally a material having a fixed width in one direction ("crossweb direction") and either a predetermined or indeterminate length in the orthogonal direction ("downweb direction"). During the various manufacturing processes used in making and handling the web, the web is conveyed along a longitudinal axis running in parallel to the length dimension of the web, and perpendicular to the width dimension of the web.

Optical film is one example of a manufactured film and is applied to a wide variety of consumer products. As an example, sheet parts converted from optical film may be in a screen assembly of an electronic device (e.g., a mobile phone, a television, a laptop computer, a desktop computer, or a tablet). A manufacturing facility may produce a plurality of similar sheet parts (e.g., optical film sheet parts) intended to be applied to particular consumer products. Often, sheet parts produced by a manufacturing facility need to be inspected for quality-compromising defects such that sheet parts determined to be defective can be discarded. In some examples, sheet parts are inspected by employees of the manufacturing facility. Additionally, or alternatively, sheet parts may be inspected using image processing techniques configured to automatically identify defects.

SUMMARY

In general, this disclosure describes techniques for inspecting a plurality of irregularly shaped sheet parts for defects. More specifically, this disclosure describes example techniques for identifying and processing an inspection region of each sheet part of the plurality of sheet parts, where the inspection region represents an irregularly shaped area (e.g., an area including any combination of rounded corners, tabs, or indents) of the respective sheet part. In other words, it may be desirable to inspect an interior region of the sheet part while ignoring a surrounding region of the sheet part. As such, the example techniques of this disclosure may enable the identification of a region that is in close proximity to irregular characteristics of a sheet part, so that a quality of the sheet part may be sufficiently determined.

In one embodiment, a system for determining a quality of each of a plurality of sheet parts produced by a manufacturing facility includes an inspection device including at least one image capture device, the at least one image capture device configured to capture a set of reference images of a sheet part of the plurality of sheet parts. The system further includes a processing unit configured to identify at least one primary point in a reference image of the set of reference images and identify at least one secondary point in a mask image of a set of mask images, where the mask image defines a silhouette of the sheet part including a size and a shape of the sheet part for inspection, and where the mask image corresponds to the reference image. The processing unit is further configured to transform the mask image based on the at least one primary point and the at least one secondary point, where the transforming changes at least one of an orientation of the mask image or a shape of the mask image to align the orientation of the mask image to an orientation of the reference image and to align the shape of the mask image to a shape of the reference image and apply the transformed mask image to the reference image to identify an inspection region within the reference image. Additionally, the processing unit is configured to process the inspection region of the reference image to determine the quality of the sheet part and output information indicative of the quality of the sheet part.

In another embodiment, a processing unit is configured to receive a set of reference images of a sheet part of a plurality of sheet parts, where the set of reference images are captured by at least one image capture device. The processing unit is further configured to identify at least one primary point in a reference image of the set of reference images and identify at least one secondary point in a mask image of a set of mask images, where the mask image defines a silhouette of the sheet part including a size and a shape of the sheet part for inspection, and where the mask image corresponds to the reference image. Additionally, the processing unit is configured to transform the mask image based on the at least one primary point and the at least one secondary point, where the transforming changes at least one of an orientation of the mask image or a shape of the mask image to align the orientation of the mask image to an orientation of the reference image and to align the shape of the mask image to a shape of the reference image, apply the transformed mask image to the reference image to identify an inspection region within the reference image, process the inspection region of the reference image to determine a quality of the sheet part, and output information indicative of the quality of the sheet part.

In another embodiment, a method includes capturing, using at least one image capture device of an inspection system, a set of reference images of a sheet part of a plurality of sheet parts, identifying, using a processing unit, at least one primary point in a reference image of the set of reference images, and identifying, using the processing unit, at least one secondary point in a mask image of a set of mask images, where the mask image defines a silhouette of the sheet part including a size and a shape of the sheet part for inspection, and where the mask image corresponds to the reference image. Additionally, the method includes transforming, using the processing unit, the mask image based on the at least one primary point and the at least one secondary point, where the transforming changes at least one of an orientation of the mask image or a shape of the mask image to align the orientation of the mask image to an orientation of the reference image and to align the shape of the mask image to a shape of the reference image, applying, using the processing unit, the transformed mask image to the reference image to identify an inspection region within the reference image, processing, using the processing unit, the inspection region of the reference image to determine a quality of the sheet part, and outputting, using the processing unit, information indicative of the quality of the sheet part.

The techniques of this disclosure may provide at least one advantage. For example, since a mask image defines a silhouette of a sheet part, the techniques may enable the identification and processing of an inspection region to determine a quality of an irregularly shaped sheet part. Additionally, the techniques provide flexibility for aligning an orientation of the mask image with an orientation of the reference image, allowing the identification of an inspection region of a sheet part that is rotationally displaced from a longitudinal axis. Moreover, the mask image may define a binary image having only two possible pixel values. As such, it may be beneficial to transform the mask image instead of the reference image so that during transformation, pixel values do not need to be altered.

The details of at least one example of the disclosure are set forth in the accompanying drawings and the description below. Other features, objects, and advantages of the disclosure will be apparent from the description and drawings, and from the claims.

DETAILED DESCRIPTION

Figure 1:
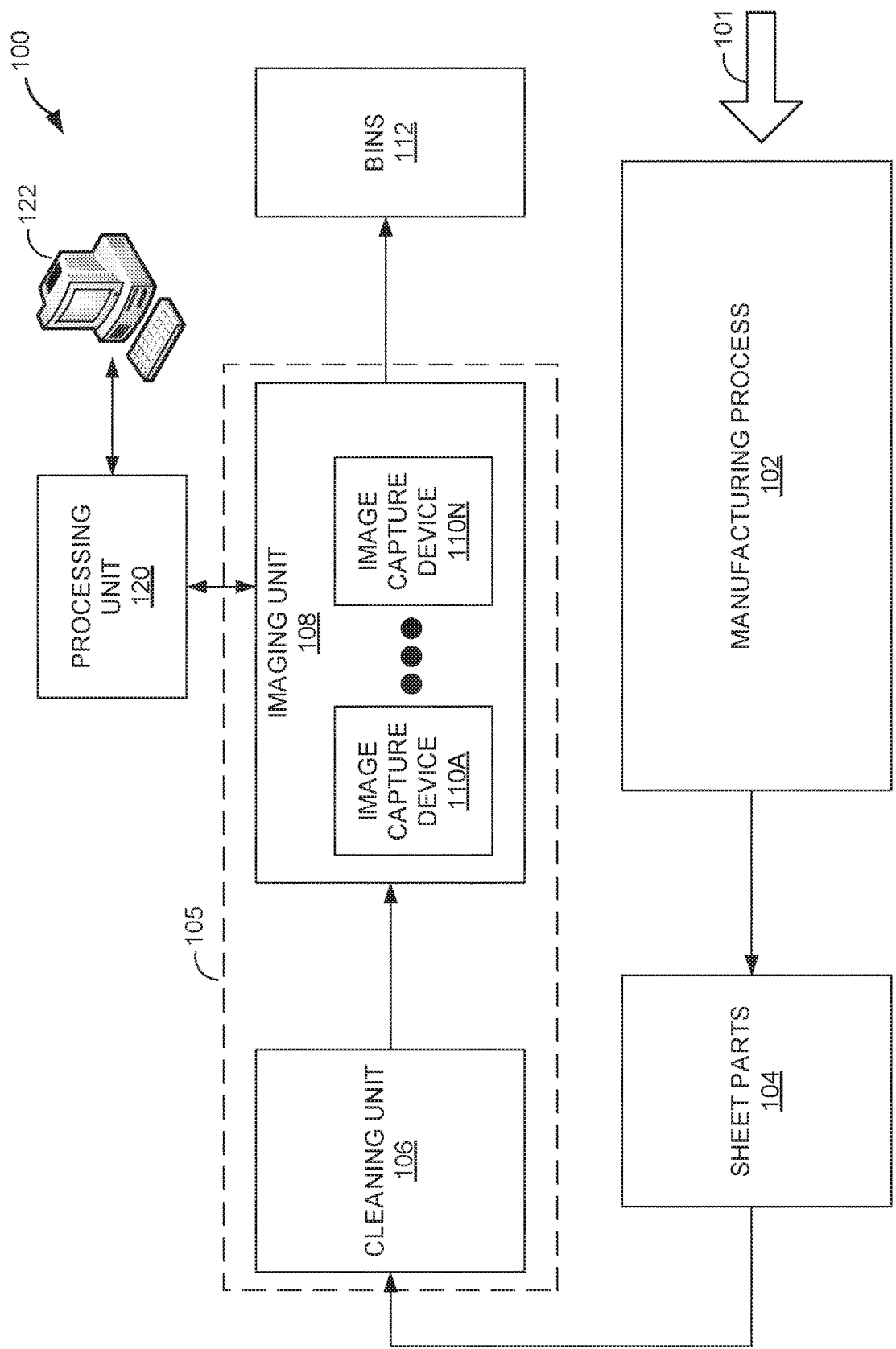
FIG. 1 is a block diagram illustrating a system for manufacturing a plurality of sheet parts, and for imaging and inspecting the plurality of sheet parts for defects, in accordance with at least one exemplary technique described in this disclosure.

Systems and techniques are described for automatically determining a quality of each sheet part of a plurality of sheet parts created by a manufacturing facility to enable sorting the plurality of sheet parts into bins according to quality. Accuracy may be important while determining the quality of the plurality of sheet parts, as erroneous quality determinations may cause a high-quality sheet part to be discarded or may cause a low-quality sheet part to be shipped for consumption. Consequently, a well-performing inspection system may increase an efficiency of the manufacturing facility and increase the quality of sheet parts produced by the manufacturing facility.

The present disclosure describes image processing techniques used to analyze a set of reference images of a sheet part for quality-compromising defects. Such defects may determine a quality category (e.g., a satisfactory category, a defective category, or a rework category) of the sheet part. An inspection device may capture a set of reference images corresponding to each sheet part of a plurality of sheet parts. In some cases, it may be beneficial to inspect specific regions of the sheet part such as an interior region, a boundary region, or a region outside of the boundary region. As such, a processing unit may place a mask image over a reference image of the set of reference images, where the mask image represents an area of the sheet part to be examined for defects. As such, a processing unit may place a mask image over a reference image of the set of reference images to cover the interior region of the reference image, where the interior region covered by the mask image represents the region to be inspected for defects. Alternatively, for example, a processing unit may place a mask image over the reference image of the set of reference images to obscure the boundary region of the reference image, while the interior region of the reference image remains exposed for inspection. Alternatively, for example, multiple individual regions may be obscured or open for inspection and the mask image may be configured appropriately for each case.

While each sheet part of the plurality of sheet parts may be substantially similar in size and shape, each sheet part may enter the inspection device at a different angle relative to a longitudinal axis. Consequently, reference images may depict the plurality of sheet parts at different angles relative to the longitudinal axis. In addition, each sheet part may be slightly different in size depending on the manufacturing operations and tolerances. Consequently, reference image may depict the plurality of sheet parts at different shape scales.

Prior to inspecting the plurality of sheet parts, the inspection device may create a set of mask images. In some examples, the set of mask images are binary images (i.e., the mask images are exclusively black and white) in a shape of an example sheet part of the plurality of sheet parts. To create the set of mask images, the inspection device may capture an example set of reference images of the example sheet part. A user interface of the inspection device may accept an input, where the input creates the set of mask images based on the example set of reference images. The set of mask images may be oriented at a predetermined angle relative to the longitudinal axis. As such, the processing unit may transform a mask image such that an orientation of the mask image is aligned with an orientation of a respective reference image. In other words, the transformed mask image may be "tilted" about the longitudinal axis such that the transformed mask image adopts the orientation of the respective reference image. Furthermore, the processing unit may transform a mask image such that a shape of the mask image is aligned with a shape of a respective reference image. In some examples, an affine transformation transforms the set of mask images. The affine transformation may be configured to transform the set of mask images to adopt at least one of the shape and the orientation of each reference image of each sheet part of the plurality of sheet parts. Consequently, the processing unit may be configured to identify an inspection region of each reference image and determine the quality of each sheet part.

The methods and systems of this disclosure may enable quickly measuring the plurality of sheet parts. For example, transforming the set of mask images may enable quickly and accurately determining the quality of the plurality of sheet parts, thus improving the efficiency of the manufacturing facility. After determining the quality of a sheet part, the inspection device may sort the sheet part into bins according to the determined quality of the sheet part.

FIG. 1 is a block diagram illustrating a system for manufacturing a plurality of sheet parts, and for imaging and inspecting the plurality of sheet parts for defects, in accordance with at least one exemplary technique described in this disclosure. In the example illustrated in FIG. 1, system 100 includes inputs 101, manufacturing process 102, sheet parts 104, inspection device 105, cleaning unit 106, imaging unit 108, image capture devices 110A-110N (collectively, "image capture devices 110"), bins 112, processing unit 120, and user interface 122.

Manufacturing process 102 as shown in FIG. 1 receives various inputs 101 (e.g., material, energy, people, and machinery) and produces an output including a plurality of sheet parts (e.g., sheet parts 104). Manufacturing process 102 is not limited to any particular type or form of manufacturing and is illustrative of any type of manufacturing process operable to produce sheet parts. In some examples, inputs 101 include a long continuous sheet of a roll good product (e.g., a polyester film (e.g., an optical film)). Manufacturing process 102 may include partitioning individual portions of the long continuous sheet to create sheet parts 104. For example, sheet parts 104 may include pieces cut from the long continuous sheet, the pieces having a basic shape (e.g., a square, a rectangle, or a circle). Additionally, or alternatively, sheet parts 104 may define an irregular shape. In some examples, sheet parts 104 include pieces of the long continuous sheet cut in the shape of an object (e.g., a mobile device, a laptop computer, a desktop computer, a television, or a window). Once produced by manufacturing process 102, sheet parts 104 may be applied to a surface of the respective object.

Sheet parts 104 may be substantially similar in shape, material composition, and thickness such that each sheet part of the plurality of sheet parts appears to be alike. In some examples, a diagonal measurement of a sheet part of sheet parts 104 is greater than 10 millimeters (mm) and less than 2,000 mm. In some examples, a nominal thickness of sheet parts 104 is greater than about 20 micrometers and less than about 500 micrometers, although the nominal thickness dimension of sheet parts 104 is not limited to this range of thicknesses, and sheet parts 104 may have a nominal thickness that is greater than about 500 micrometers or less than about 20 micrometers. In some embodiments, each sheet part of sheet parts 104 comprises a single layer of transparent or semi-transparent material or may include a plurality of layers of materials. Sheet parts 104 may comprise transparent or semi-transparent material intended to provide particular levels of light transmission, generally through the thickness dimension of sheet parts 104, for a particular wavelength of light or for a range of wavelengths of light. Sheet parts 104 may have various requirements related to the flatness of the top and/or bottom surfaces of the sheet parts, and/or related to the lack of defects.

During the manufacturing process 102, sheet parts 104 may accrue a variety of defects. In some examples, defects include particles, scuffs, scratches, dents, streaks, or impressions. A presence of defects may determine a quality of a sheet part of sheet parts 104. Some defects are miniscule in size and severity, and do not noticeably affect the quality of a sheet part. However, other defects may be more severe, and may negatively affect the quality of the sheet part. A sheet part may be classified as defective if greater than a primary threshold level of defects is detected in the sheet part. Additionally, or alternatively, a sheet part may be classified as satisfactory if less than a secondary threshold level of defects is detected in the sheet part. In some cases, a sheet part may be classified into a "rework" category if greater than the secondary threshold level of defects is detected in the sheet part and less than the primary threshold level of defects is detected. In other words, "rework" sheet parts may possess a higher quality level than defective sheet parts and a lower quality level than satisfactory sheet parts.

System 100 may manufacture and inspect sheet parts 104 in an assembly line. In other words, after manufacturing process 102 creates sheet parts 104, the sheet parts may travel through cleaning unit 106 and imaging unit 108. Subsequently, sheet parts 104 may be sorted into bins 112. Sheet parts 104 may continuously cycle through system 100 such that additional sheet parts enter imaging unit 108 as newly inspected sheet parts exit imaging unit 108 into bins 112. In some examples, a moving belt (e.g., a conveyor belt) continuously transports sheet parts 104 from an endpoint of manufacturing process 102 through inspection device 105 to bins 112.

Inspection device 105 may include cleaning unit 106 and imaging unit 108. In some examples, inspection device 105 includes an entry zone (not shown) for sheet parts 104 to enter inspection device 105. In some examples, the entry zone of inspection device 105 automatically receives a sheet part from a collection of sheet parts 104. For example, the entry zone of inspection device 105 may include a portion of a moving belt that transports sheet parts 104 from manufacturing process 102, enabling sheet parts 104 to efficiently enter inspection device 105. In other examples, sheet parts 104 may be assembled in a stack after the sheet parts are created by manufacturing process 102, and individual sheet parts of the stack of sheet parts may automatically and continuously dispense onto the entry zone of inspection device 105. Additionally, or alternatively, inspection device 105 may include a selection member (not shown) configured to select an individual sheet part from the stack of sheet parts 104 and place the individual sheet part onto the entry zone of inspection device 105. In other examples, a device operator may manually place sheet parts 104 on the entry zone.

In the example of FIG. 1, inspection device 105 includes cleaning unit 106 configured to remove particles (e.g., airborne particles, dust particles, or liquid droplets) from a surface of sheet parts 104 as the sheet parts travel to imaging unit 108. By cleaning sheet parts 104 before imaging, cleaning unit 106 may prevent system 100 from falsely detecting defects in reference images of the plurality of sheet parts 104 and needlessly classifying sheet parts as defective. Although FIG. 1 illustrates inspection device 105 as including cleaning unit 106, in some examples (not shown), inspection device 105 does not include cleaning unit 106. For example, sheet parts 104 may advance directly to imaging unit 108 after being produced by manufacturing process 102.

Imaging unit 108 may include image capture devices 110. Each of image capture devices 110 may be a camera or other component configured to capture image data representative of sheet parts 104 within imaging unit 108. In other words, the image data captures a visual representation of an environment, such as sheet parts 104 within imaging unit 108. Each of image capture devices 110 may include components capable of capturing image data, such as a video recorder, an infrared camera, a CCD (Charge Coupled Device) array, or a laser scanner. Moreover, the captured image data can include at least one of an image, a video, a sequence of images (e.g., multiple images taken within a time period and/or with an order), or a collection of images.

In some examples, image capture devices 110 are conventional imaging devices that are capable of reading a sequential portion of a moving sheet part and providing output in the form of a digital data stream. Image capture devices 110 may be cameras that directly provide a digital data stream or an analog camera with an additional analog to digital converter. Additionally, image capture devices 110 may include other sensors, such as, for example, laser scanners. Examples of image capture devices 110 include linescan cameras such as those marketed under the trade designation "PIRANHA" from Dalsa, Waterloo, Ontario, Canada and "ELIIXA" from Teledyne e2v, Thousand Oaks, Calif. Additional examples include laser scanners from Surface Inspection Systems GmbH, Munich, Germany, in conjunction with an analog to digital converter. In some examples, an imaging resolution of image capture devices 110 is greater than about 10 micrometers per pixel and less than about 50 micrometers per pixel. For example, an imaging resolution of image capture devices 110 may be about 25 micrometers per pixel.

Each of image capture devices 110 may capture a set of reference images corresponding to a sheet part of sheet parts 104. In some examples, if imaging unit 108 includes N number of image capture devices 110, image capture devices 110 will capture a set of N reference images of the sheet part. For example, if imaging unit 108 includes five image capture devices 110, image capture devices 110 will capture a set of five reference images of the sheet part. In some examples, image capture devices 110 capture a set of reference images of the sheet part simultaneously. In other examples, image capture devices 110 capture a set of reference images of the sheet part in a consecutive order. As a plurality of sheet parts cycle through imaging unit 108, image capture devices 110 may capture a set of reference images corresponding to each sheet part of the plurality of sheet parts.

Automatic image capturing may increase a rate in which system 100 is able to determine a quality of sheet parts 104. In some examples, as a sheet part travels through system 100, image capture devices 110 detect a presence of the sheet part within imaging unit 108. In response to detecting the sheet part, image capture devices 110 may capture a set of reference images of the sheet part. In some examples, image capture devices 110 simultaneously capture the set of reference images in response to a single image capture device (e.g., image capture device 110A) detecting the presence of the sheet part. In other examples, each image capture device of image capture devices 110 independently detects the presence of the sheet part, responsively capturing a reference image of the sheet part after detecting the sheet part. For example, image capture device 110A may detect the sheet part in response to the sheet part travelling between a light (not shown) and image capture devices 110. The resulting obfuscation of the light by the sheet part may be detected by at least one light sensor of image capture device 110A, thus triggering image capture device 110A to capture a reference image of the sheet part. In this manner, each of the other image capture devices (i.e., image capture devices 110B-110N) may sense the presence of the sheet part and independently capture reference images pf the sheet part. The reference images of a sheet part captured by image capture devices 110 may form a set of reference images. As such, image capture devices 110 may capture a plurality of sets of reference images, where each set of reference images of the plurality of sets of reference images corresponds to a sheet part of sheet parts 104.

After imaging unit 108 captures a set of reference images of a sheet part, inspection device 105 may output the set of reference images to processing unit 120. Processing unit 120 may be configured to assess a quality of the sheet part. For example, processing unit 120 may identify at least one primary point in a reference image of the set of reference images. Additionally, processing unit 120 may identify at least one secondary point in a mask image (e.g., mask image) of a set of mask images. In some examples, the mask image corresponds to an area of the sheet part to be examined for defects. More specifically, the mask image may define a silhouette of the sheet part including a size and a shape of the sheet part for inspection. Processing unit 120 may transform the mask image based on the at least one primary point and the at least one secondary point identified in the reference image and the mask image, respectively. The set of mask images may be created based on manual input to a user interface, such as user interface 122.

In some examples, user interface 122 allows a user to control system 100. User interface 122 includes any combination of a display screen, a touchscreen, buttons, speaker inputs, or speaker outputs. In some examples, user interface 122 is configured to power on or power off any combination of the elements of system 100. Additionally, or alternatively, user interface 122 may include a mask image application. The mask image application may be executed by any combination of processing circuitry located within user interface 122 and processing circuitry of processing unit 120. The mask image application may enable system 100 to create the set of mask images based on an input representing manually drawn outlines of an example sheet part. In other words, image capture devices 110 may capture a set of example reference images, and system 100 may create the set of mask images based on the set of example reference images, where each mask image of the set of mask images corresponds to an example reference image of the set of example reference images. For example, the mask image application may enable a user to view each example reference image via user interface 122. Additionally, user interface 122 may allow a user to trace an outline of an example reference image, the mask image application creating a respective mask image based on the outline traced by the user. The set of mask images may be stored in storage units of processing unit 120.

Transforming the mask image may change at least one of an orientation of the mask image or a shape of the mask image to align the orientation of the mask image to an orientation of the reference image and to align the shape of the mask image to a shape of the reference image. For example, if mask image is aligned with a longitudinal axis and reference image is tilted five degrees relative to the longitudinal axis, processing unit 120 may transform the mask image to be tilted five degrees relative to the longitudinal axis. After mask image is transformed, processing unit 120 may apply the transformed mask image to the reference image, identifying an inspection region within the reference image. In other words, processing unit 120 may overlay the transformed mask image on the reference image, partially covering the reference image. A portion of the reference image that is covered by mask image may represent the inspection region. Processing unit 120 may process the inspection region of the reference image to determine the quality of the sheet part, and processing unit 120 may output information indicative of the quality of the sheet part.

Processing unit 120 may independently assess a quality of a sheet part of sheet parts 104 based on each reference image of the set of reference images corresponding to the sheet part. As discussed above, particular mask images within the set of mask images may be associated with particular "views" (i.e., image capture devices 110) used to image sheet parts 104. Each view may represent an imaging technique or modality. For example, views may include any combination of transmitted light imaging, focused light imaging, reflected light imaging, darkfield light imaging, laser scanning, or x-ray imaging. In one example, each view may be associated with a different mask image within the set of mask images. In other examples, groups of views may share a single mask image of the set of mask images. In order to comprehensively assess the quality of a sheet part of the plurality of sheet parts 104, processing unit 120 may identify an inspection region in each reference image of the set of reference images associated with the sheet part. Processing unit 120 may independently process each inspection region, and processing unit 120 may independently make a quality determination based on each reference image of the set of reference images. After processing the set of reference images, processing unit 120 may output information indicative of a quality classification of the sheet part.

Inspection device 105 may receive information indicative of a determined quality category of a sheet part. In response to receiving the information indicative of the quality category, inspection device 105 may place the sheet part in bins 112.

Bins 112 may be configured to receive sheet parts classified into at least one quality category (e.g., the satisfactory category, the defective category, and the rework category) by processing unit 120. In some examples, bins 112 include at least one bin corresponding to the at least one quality categories. For example, bins 112 may include a satisfactory bin, a defective bin, and a rework bin. An output zone (not shown) of inspection device 105 may route a classified sheet part into a respective bin. For example, a sheet part classified as "defective" by processing unit 120 is routed to a "defective" bin. In some examples, the output zone of inspection device 105 automatically routes a classified sheet part into a respective bin. Additionally, or alternatively, system 100 may indicate a classification of a sheet part and a device operator may manually sort the sheet part into a respective bin. In the examples in which the output zone automatically sorts sheet parts into respective bins 112, inspection device 105 may include a set of diverging tracks at the output zone, where each track of the diverging tracks leads to a bin of the plurality of bins 112.

In some examples, bins 112 include a defective bin. Sheet parts that are classified as defective by processing unit 120 are sorted into the defective bin. The defective sheet parts may be discarded, recycled, or reused to manufacture another product. Additionally, in some examples, bins 112 include a satisfactory bin configured to accept sheet parts possessing a satisfactory quality level. Sheet parts sorted into the satisfactory bin may be shipped from the manufacturing facility, sold, and consumed. Bins 112 may also include a rework bin. Sheet parts sorted into the rework bin may include a greater level of defects than the sheet parts sorted into the defective bin and a lesser level of defects than the sheet parts sorted into the satisfactory bin. After a sheet part is sorted into the rework bin, it may be repaired (e.g., reworked) to remove defects. After a sheet part is reworked, processing unit 120 may classify the reworked sheet part as having satisfactory quality. Examples in which system 100 sorts sheet parts into three categories (i.e., the defective category, the satisfactory category, and the rework category) increase an efficiency of system 100 over examples in which system 100 sorts sheet parts into just two categories (i.e., the defective category and the satisfactory category). Indeed, the addition of the rework category may allow system 100 to salvage sheet parts that would otherwise be classified as defective.

Figure 2:
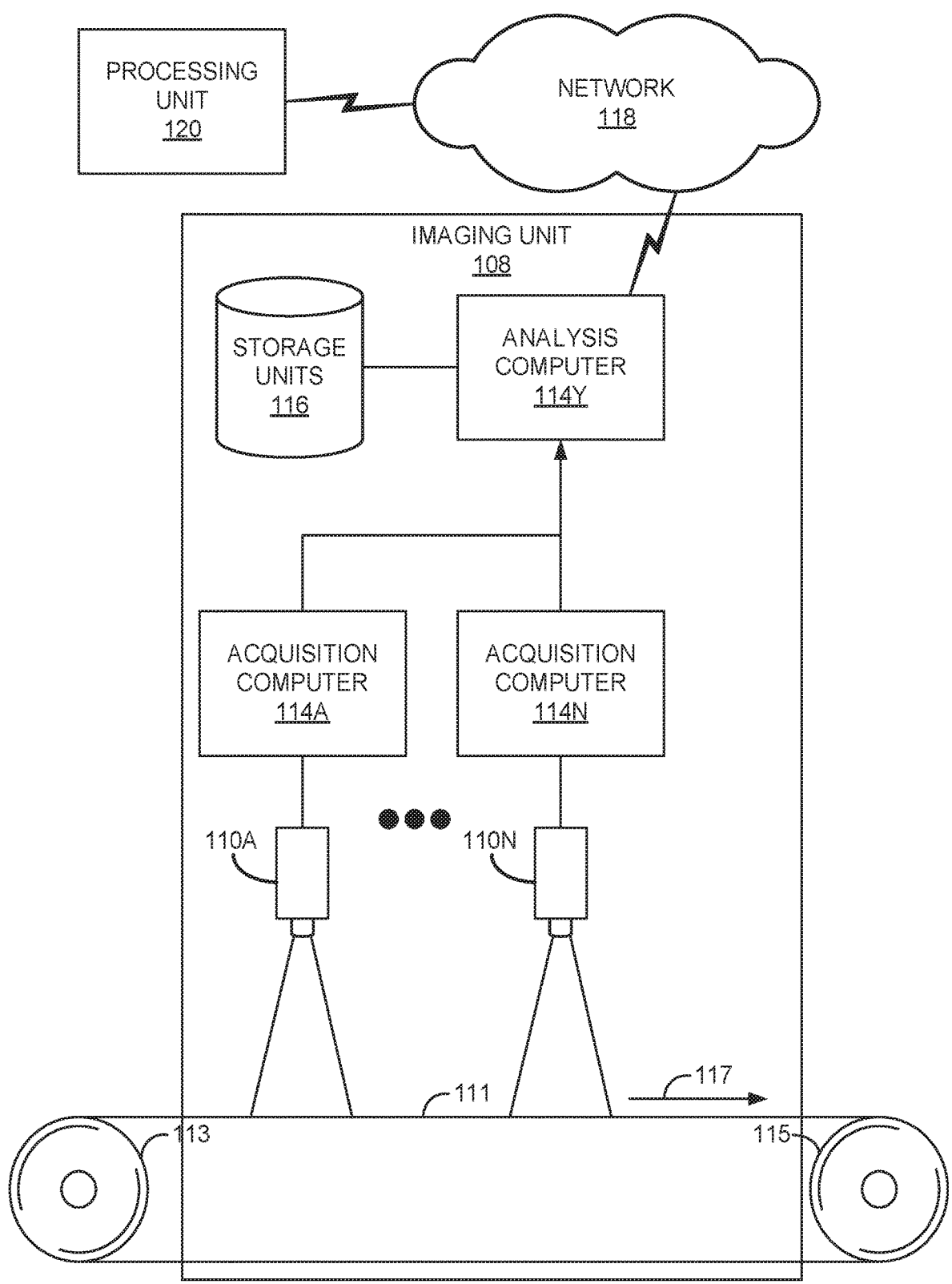
FIG. 2 is a block diagram illustrating additional details of the system of FIG. 1, in accordance with at least one exemplary technique described in this disclosure.

FIG. 2 is a block diagram illustrating additional details of system 100 of FIG. 1, in accordance with at least one exemplary technique described in this disclosure. As shown in FIG. 2, system 100 includes image capture devices 110, moving belt 111, proximal wheel 113, acquisition computers 114A-114N (collectively, "acquisition computers 114"), analysis computer 114Y, distal wheel 115, storage units 116, network 118, and processing unit 120.

System 100 includes image capture devices 110A-110N arranged to inspect sheet parts continuously advanced past the image capture devices. In the exemplary embodiment of inspection system 100 as shown in FIG. 2, at least one sheet part of sheet parts 104 is positioned on moving belt 111 between proximal wheel 113 and distal wheel 115. Image capture devices 110 are positioned adjacent to a surface of the sheet parts so that each of image capture devices 110 may capture a reference image of each sheet part that advances through imaging unit 108. The number of image capture devices that may be included in image capture devices 110A-110N is not limited to a particular number of devices and may be two or more devices. Further, the physical arrangement and alignment of image capture devices 110A-110N as shown in FIG. 2 is not intended to represent an actual arrangement and/or alignment of the image capture devices relative to one another that might be used in an imaging unit 108 of system 100, and is intended merely to represent the concept of a plurality of image capture devices that may be used in a system such as system 100. Embodiments of the arrangement and/or alignments of a plurality of image capture devices that may be used to capture a set of reference images of a sheet part are further illustrated and described below.

Referring to FIG. 2, during the imaging process that may be performed using system 100, moving belt 111 may be advanced in a direction generally indicated by arrow 117. In some embodiments, moving belt 111 may support and advance a plurality of sheet parts (not shown) of sheet parts 104 continuously as the plurality of sheet parts are being provided by a manufacturing process, such as manufacturing process 102 (FIG. 1). In other embodiments, the imaging of the plurality of sheet parts as illustrated in FIG. 2 is performed at some point in time after the plurality of sheet parts have been manufactured and stored. In some embodiments, the plurality of sheet parts may be in the form of individual sheet parts having both a pre-defined width and length, and that are advanced through imaging unit 108 that includes image capture devices 110A-110N so the that image capture devices 110 can capture a set of reference image of each sheet part of the plurality of sheet parts.

As shown in FIG. 2, image capture devices 110 are positioned in proximity to the continuously moving belt 111 carrying the plurality of sheet parts. Moving belt 111 may be conveyed in a direction generally indicated by arrow 117, and for example by mechanical forces applied to proximal wheel 113 and/or distal wheel 115. The mechanical forces applied to rotate proximal wheel 113 and/or distal wheel 115, and thus moving belt 111, may be generated using, for example, electrical motors, or other means (none shown in FIG. 2) that are arranged to rotate proximal wheel 113 and/or distal wheel 115. As moving belt 111 is advanced in the direction indicated by arrow 117, image capture devices 110 are arranged to image the plurality of sheet parts to obtain image data.

Image capture devices 110 are not limited to any particular type of image capture devices and may be conventional imaging devices that are capable of imaging the plurality of sheet parts as moving belt 111 is advanced past the image capture devices, and provide outputs in the form of electronic signal, such as a digital data stream of image data. In some embodiments, at least one of image capture devices 110 is a line-scan camera. In other embodiments, at least one of image capture devices 110 is an area scan camera. In some embodiments, each of image capture devices 110 are a same type of image capture device. In other embodiments image capture devices 110 includes at least one image capture device that is a different type of image capture device compared to the additional image capture devices present in system 100.

As shown in FIG. 2, image capture devices 110 may include a plurality of cameras that provide electrical output signals representative of sensed images of the plurality of sheet parts to a respective set of acquisition computers 114A-114N. Acquisition computers 114A-114N are coupled to analysis computer 114Y and are arranged to provide an output representative of image data captured by the corresponding image capture devices 110A-110N to analysis computer 114Y. In other embodiments, image capture devices 110A-110N may provide a digital data stream and/or an analog signal representative of the images captured by the cameras directly to a computing device, such as analysis computer 114Y, for further processing by processing circuitry included in analysis computer 114Y. Other sensors, such as laser scanners, may be utilized as image capture devices 110A-110N.

Referring again to FIG. 2, processing circuitry of analysis computer 114Y processes image streams including image data provided from acquisition computers 114A-114N, or in the alternative directly from image capture devices 110A-110N, to generate reference images of the plurality of sheet parts advancing through imaging unit 108 on moving belt 111. As part of generating the reference images, analysis computer 114Y may arrange the reference images into a plurality of sets of reference images, where each set of reference images of the plurality of sets of reference images corresponds to a sheet part of the plurality of sheet parts. In other words, a set of reference images corresponding to a single sheet part may include a reference image captured by each image capture device of image capture devices 110A-110N. Analysis computer 114Y may also be arranged to output the image data to a database, such as storage units 116 and/or storage units of processing unit 120.

Analysis computer 114Y may be configured to perform at least one pre-processing operation on the plurality of sets of reference images captured by image capture devices 110 before forwarding the reference images to processing unit 120. Pre-processing of the reference images may include one or some combination of performing one-dimensional or two-dimensional spatial convolutions, ranked filtering (median), contrast enhancement, static flat-field correction, difference of filtered images processing, and/or frequency processing on the image data including the reference images. Examples of spatial convolutions that may be used to pre-process the image data may include neighborhood averaging, Gaussian kernels gradient filtering, and/or directional edge enhancement. Examples of difference of filtered image processing may include processing based on difference of Gaussians for the image data. Examples of frequency transforms may include processing in frequency space to remove artifacts and then application of an inverse transform.

Referring again to FIG. 2, processing unit 120 receives the plurality of sets of reference images and may be arranged to provide any of the features ascribed to processing unit 120 as illustrated and described with respect to FIG. 1. For example, processing unit 120 may analyze the data included in plurality of sets of reference images to determine if any defects, such as machine line defects, anomalies, or other types of surface and/or dimensional defects exist in the reference images. Processing unit 120 may apply at least one threshold value to the reference images to determine a quality of the sheet part associated with a functional and/or physical characteristic of the sheet part based on an analysis of the set of reference images associated with the sheet part.

A user interface (e.g., user interface 122 of FIG. 1) may be coupled to processing unit 120 and may be used to provide graphical displays that are indicative of the results of the analysis of the plurality of sets of reference images. For example, the user interface may indicate the determined quality of each sheet part that advances through imaging unit 108.

As shown in FIG. 2, processing unit 120 and analysis computer 114Y may be coupled to network 118. Network 118 is not limited to any particular type of network, and may be any network, including the internet, a Local Area Network (LAN), a Wide Area Network (WAN) using any type of communication protocol that allows the devices coupled to network 118 to communicate with one another.

Figure 3:
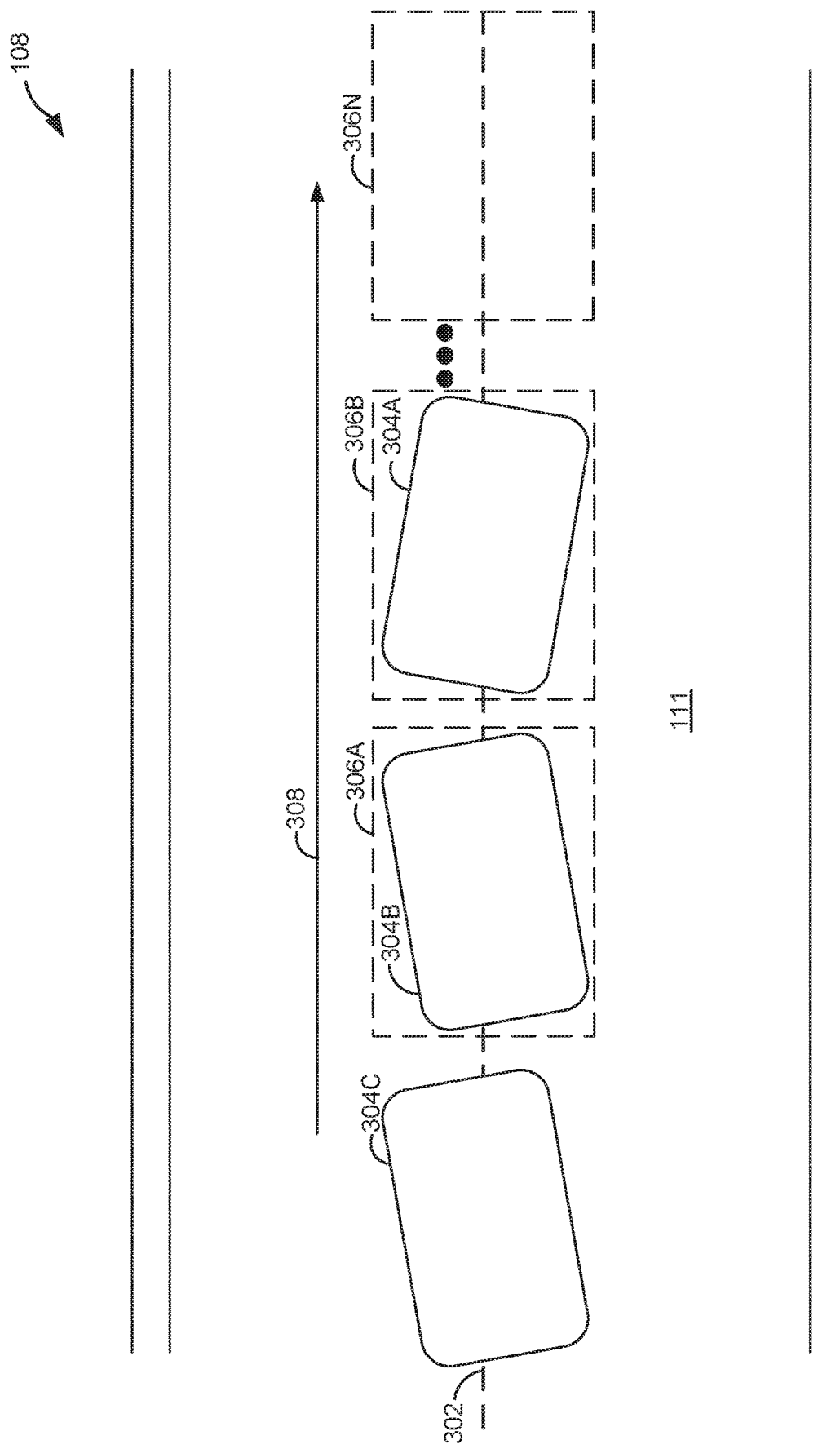
FIG. 3 is a block diagram illustrating a perspective view of an example imaging unit of the system of FIG. 1, in accordance with at least one exemplary technique described in this disclosure.

FIG. 3 is a block diagram illustrating a perspective view of imaging unit 108 of the system of FIG. 1, in accordance with at least one exemplary technique described in this disclosure. As shown in FIG. 3, imaging unit 108 may include moving belt 111, longitudinal axis 302, sheet parts 304A-304C (collectively, "sheet parts 304"), and image capture regions 306A-306N (collectively, "image capture regions 306").

Referring to FIG. 3, sheet parts 304 may be illustrated from the perspective of image capture devices 110 of FIGS. 1 and 2. In other words, FIG. 3 depicts sheet parts 304 from a "bird's eye" view. Moving belt 111 may advance in the direction indicated by arrow 308, carrying sheet parts 304 through image capture regions 306. Image capture regions 306 may correspond to image capture devices 110 of FIG. 1. For example, image capture region 306A may represent an area that image capture device 110A captures. As such, each of sheet parts 304 passes through each of image capture regions 306, and image capture devices 110 capture a set of reference images corresponding to each sheet part that advances through imaging unit 108 on moving belt 111.

Image capture regions 306 may be aligned with longitudinal axis 302 such that boundaries of image capture regions 306 are either perpendicular or parallel to longitudinal axis 302. Alternatively, for example, as seen in FIG. 3, sheet parts 304 may be tilted relative to longitudinal axis 302. Although sheet parts 304 are illustrated as being tilted with respect to longitudinal axis 302, in some examples (not shown) at least one of sheet parts 304 may be aligned with longitudinal axis 302 such that a proximal edge of the at least one sheet part and a distal edge of the at least one sheet part are normal to longitudinal axis 302.

Figure 4:
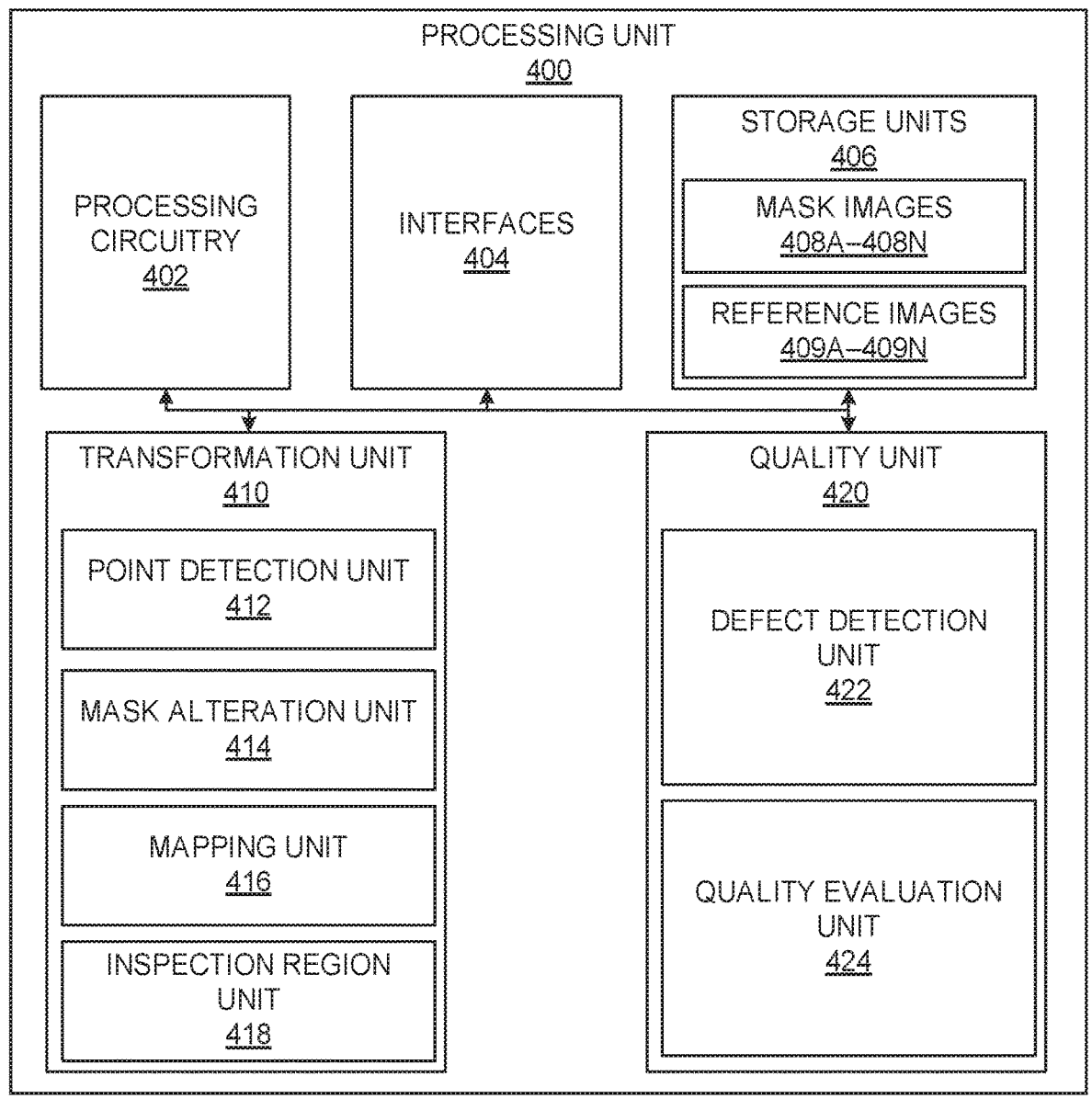
FIG. 4 is a block diagram illustrating an example processing unit, in accordance with at least one exemplary technique described in this disclosure.

FIG. 4 is a block diagram illustrating an example processing unit 400, in accordance with at least one exemplary technique described in this disclosure. Processing unit 400 may be an example or alternative implementation of processing unit 120 of system 100 of FIG. 1. The architecture of processing unit 400 illustrated in FIG. 4 is shown for exemplary purposes only. Processing unit 400 should not be limited to the illustrated example architecture. In other examples, processing unit 400 may be configured in a variety of ways. In the example illustrated in FIG. 4, processing unit 400 includes transformation unit 410 configured to determine an inspection region for inspecting a sheet part produced by a manufacturing facility. Processing unit 400 further includes a quality unit 420 configured to assess the quality of the sheet part by detecting defects in the inspection region identified by transformation unit 410.

Processing unit 400 may be implemented as any suitable computing system, (e.g., at least one server computer, workstation, mainframe, appliance, cloud computing system, and/or other computing system) that may be capable of performing operations and/or functions described in accordance with at least one aspect of the present disclosure. In some examples, processing unit 400 is electrically coupled to inspection device 105 of FIG. 1. In other examples, Processing unit 400 represents a cloud computing system, server farm, and/or server cluster (or portion thereof) configured to connect with system 100 via a wireless connection. In other examples, processing unit 400 may represent or be implemented through at least one virtualized compute instance (e.g., virtual machines or containers) of a data center, cloud computing system, server farm, and/or server cluster. In some examples, processing unit 400 includes at least one computing device, wherein each computing device having a memory and at least one processor.

As shown in the example of FIG. 2, processing unit 400 includes processing circuitry 402, at least one interface 404, and at least one storage unit 406. Processing unit 400 also includes a transformation unit 410 and a quality unit 420, which may be implemented as program instructions and/or data stored in storage units 406 and executable by processing circuitry 402. Storage units 406 of processing unit 400 may also store an operating system (not shown) executable by processing circuitry 402 to control the operation of components of processing unit 400. The components, units or modules of processing unit 400 are coupled (physically, communicatively, and/or operatively) using communication channels for inter-component communications. In some examples, the communication channels include a system bus, a network connection, an inter-process communication data structure, or any other method for communicating data.

Processing circuitry 402, in one example, may include at least one processor that are configured to implement functionality and/or process instructions for execution within processing unit 400. For example, processing circuitry 402 may be capable of processing instructions stored by storage units 406. Processing circuitry 402, may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Processing unit 400 may utilize interfaces 404 to communicate with external systems via at least one network. In some examples, interfaces 404 include an electrical interface (e.g., at least one of an electrical conductor, a transformer, a resistor, a capacitor, or an inductor) configured to electrically couple processing unit 400 to inspection device 105. In other examples, interfaces 404 may be network interfaces (e.g., Ethernet interfaces, optical transceivers, radio frequency (RF) transceivers, Wi-Fi, or via use of wireless technology under the trade "BLUETOOTH", telephony interfaces, or any other type of devices that can send and receive information). In some examples, processing unit 400 utilizes interfaces 404 to wirelessly communicate with external systems (e.g., inspection device 105 of FIG. 1).

Storage units 406 may be configured to store information within processing unit 400 during operation. Storage units 406 may include a computer-readable storage medium or computer-readable storage device. In some examples, storage units 406 include at least a short-term memory or a long-term memory. Storage units 406 may include, for example, random access memories (RAM), dynamic random access memories (DRAM), static random access memories (SRAM), magnetic discs, optical discs, flash memories, magnetic discs, optical discs, flash memories, forms of electrically programmable memories (EPROM), or forms of electrically erasable and programmable memories (EEPROM). In some examples, storage units 406 are used to store program instructions for execution by processing circuitry 402. Storage units 406 may be used by software or applications running on processing unit 400 to temporarily store information during program execution.

As seen in the example of FIG. 4, transformation unit 410 includes point detection unit 412, mask alteration unit 414, mapping unit 416, and inspection region unit 418. Additionally, quality unit 420 includes defect detection unit 422 and quality evaluation unit 424.

Mask images 408A-408N (collectively, "mask images 408") may be an example of the set of mask images created using user interface 122 of FIG. 1. Processing unit 400 may receive data indicative of mask images 408 via interfaces 404. Reference images (409A-409N) (collectively, "reference images 409") may be an example of the plurality of sets of reference images captured by image capture devices 110 of FIG. 1. Each set of reference images may be associated with a sheet part of a plurality of sheet parts (e.g., sheet parts 104 of FIG. 1). Processing unit 400 may receive data indicative of reference images 409 via interfaces 404. In fact, processing unit 400 may receive sets of reference images 409 in real-time, individually processing each set of reference images 409 to determine a quality of the respective sheet part. At least one mask image of mask images 408 may be associated with each reference image of a set of reference images 409.

Point detection unit 412 may identify at least one primary point in a reference image (e.g., reference image 409A) of a set of reference images 409 corresponding to a sheet part of the plurality of sheet parts 104. In some examples, point detection unit 412 is configured to identify the at least one primary point by identifying a plurality of primary edges in reference image 409A. Each primary point of the at least one primary point may represent an intersection between a pair of primary edges of the plurality of primary edges. Point detection unit 412 may extrapolate the plurality of primary edges such that pairs of the plurality of primary edges intersect at known coordinates. The known coordinates may define the at least one primary point. In some examples, the plurality of primary edges of reference image 409A includes four primary edges, and the four primary edges may not intersect at known coordinates. For example, the four primary edges may be connected by four rounded corners. In other examples, reference image 409A may include more than four primary edges or less than four primary edges. Point detection unit 412 may be configured to identify at least one primary point in each reference image in the set of reference images 409.

Additionally, point detection unit 412 may identify at least one secondary point in a mask image (e.g., mask image 408A) of the set of mask images 408. Mask image 408A may be associated with reference image 409A. For example, user interface 122 of FIG. 1 may create mask image 408A based on an example reference image captured by the same image capture device (e.g., image capture device 110A of FIG. 1) that captured reference image 409A. In some examples, point detection unit 412 is configured to identify the at least one secondary point by identifying a plurality of secondary edges in mask image 408A. Each secondary point of the at least one secondary point may represent an intersection between a pair of secondary edges of the plurality of secondary edges. Point detection unit 412 may extrapolate the plurality of secondary edges such that pairs of the plurality of secondary edges intersect at known coordinates. The known coordinates represent the at least one secondary point. In some examples, the plurality of secondary edges of mask image 408A includes four secondary edges, however the four secondary edges may not intersect at known coordinates. In other examples, mask image 408A may include more than four secondary edges or less than four secondary edges. Point detection unit 412 may be configured to identify at least one secondary point in each of mask images 408.

Mask alteration unit 414 may be configured to crop mask image 408A. For example, mask image 408A may define a solid shape resembling the sheet part. The solid shape may be bounded by a combination of plurality of straight edges (e.g., the plurality of secondary edges) and a plurality of rounded corners. Mask alteration unit 414 may be configured to alter the boundary of mask image 408A by a predetermined distance while maintaining a shape of mask image 408A. In some examples, mask alteration unit 414 alters the boundary of mask image 408A by the predetermined distance by displacing the boundary by a predetermined number of pixels. By altering the boundary of mask image 408A by the predetermined distance, mask alteration unit 414 may be configured to alter a size (e.g., an area) of mask image 408A. In some examples, mask alteration unit 414 moves the boundary of mask image 408A inwards by a distance of greater than about 10 micrometers and less than about 500 micrometers. For example, mask alteration unit 414 may move the boundary of mask image 408A inwards by a distance of about 20 micrometers. In other examples, mask alteration unit 414 moves the boundary of mask image 408A outwards by a predetermined distance. In other examples, mask alteration unit 414 does not change the size, alter the boundaries, or otherwise change mask image 408A.

Mapping unit 416 may transform mask image 408A based on the at least one primary point and the at least one secondary point identified by point detection unit 412. Transforming mask image 408A may change an orientation of the mask image to resemble an orientation of the respective reference image 409A. Additionally, transforming mask image 408A may change a shape of the mask image to resemble a shape of the respective reference image 409A. In some examples, mapping unit 416 is configured to transform mask image 408A using an affine transformation algorithm.

An affine transformation algorithm is function that is configured to map between affine spaces. In some examples, a first affine space includes sets of parallel lines and a plurality of points. The sets of parallel lines may include at least some of the plurality of points. Parallel lines of the first affine space may intersect at a plurality of angles. If the first affine space is mapped to a second affine space using an affine transformation, each set of parallel lines will remain parallel in the second affine space. However, the plurality of angles between pairs of intersecting lines may change between the first affine space and the second affine space. Additionally, each point of the plurality of points in the first affine space may be preserved in the second affine space. However, distances between points of the plurality of points may be altered between the first affine space and the second affine space. An example first affine space may include a rectangle. The rectangle is defined by two sets of parallel lines, including four total lines. The four total lines intersect at four points, the lines intersecting at right angles. An affine transformation may map the example first affine space to an example second affine space. The example second affine space may define a rhombus having two sets of parallel lines. However, unlike the example first affine space, the intersecting lines of the example second affine space do not intersect at right angles. As such, the affine transformation algorithm preserves the sets of parallel lines from the example first affine space to the example second affine space and alters angles of intersecting lines.

In the example illustrated in FIG. 2, mapping unit 416 may compute an affine transformation matrix. The affine transformation matrix may include a group of values that enable an affine transformation algorithm to map a first affine space to a second affine space. For example, mask image 408A may define a first affine space and a transformed mask image 408A may define a second affine space. The affine transformation matrix may enable the affine transformation algorithm to transform mask image 408A to align an orientation of mask image 408A with an orientation of reference image 409A. Furthermore, the affine transformation matrix may enable the affine transformation algorithm to change a shape of mask image 408A to adopt a shape of reference image 409A. In some examples, the affine transformation matrix includes six values given by equestion. 1.

$$H = \begin{bmatrix} h_1 & h_2 & h_3 \\ h_4 & h_5 & h_6 \end{bmatrix} \qquad (\text{eq. 1})$$

The affine transformation matrix may be calculated by using matrix algebra to solve for h in the equation b=Ah (eq. 5). For example, primary points identified in reference image 409A may be given by the coordinates $[x_p^i, y_p^i]$. Secondary points identified in the respective mask image 408A may be given by the coordinates $[x_m^i, y_m^i]$. Based on the primary points and the secondary points, mapping unit 416 may assemble matrix A and matrix b, as seen below in (eq. 2) and (eq. 3), respectively.

$$A = \begin{bmatrix} x_p^1 & y_p^1 & 1 & 0 & 0 & 0 \\ 0 & 0 & 0 & x_p^1 & y_p^1 & 1 \\ \vdots & \vdots & \vdots & \vdots & \vdots & \vdots \\ x_p^n & y_p^n & 1 & 0 & 0 & 0 \\ 0 & 0 & 0 & x_p^n & y_p^n & 1 \end{bmatrix} \qquad (\text{eq. 2})$$

$$b = \begin{bmatrix} x_m^1 \\ y_m^1 \\ \vdots \\ x_m^n \\ y_m^n \end{bmatrix} \qquad (\text{eq. 3})$$

$$h = \begin{bmatrix} h_1 \\ h_2 \\ h_3 \\ h_4 \\ h_5 \\ h_6 \end{bmatrix} \quad (\text{eq. 4})$$

$$\begin{bmatrix} x_m^1 \\ y_m^1 \\ \vdots \\ x_m^n \\ y_m^n \end{bmatrix} = \begin{bmatrix} x_p^1 & y_p^1 & 1 & 0 & 0 & 0 \\ 0 & 0 & 0 & x_p^1 & y_p^1 & 1 \\ \vdots & \vdots & \vdots & \vdots & \vdots & \vdots \\ x_p^n & y_p^n & 1 & 0 & 0 & 0 \\ 0 & 0 & 0 & x_p^n & y_p^n & 1 \end{bmatrix} \begin{bmatrix} h_1 \\ h_2 \\ h_3 \\ h_4 \\ h_5 \\ h_6 \end{bmatrix} \quad (\text{eq. 5})$$

Mapping unit 416 may solve for the transformation matrix h (eq. 4) by performing a least-squares estimate. For example, mapping unit 416 may solve for h by applying the equation $h=(A^TA)^{-1}A^Tb$. In other words, mapping unit 416 may solve for transformation matrix h by first multiplying a transpose of matrix A by matrix A itself. Next, mapping unit 416 may compute an inverse of the multiplication of the transpose of matrix A by matrix A. After computing the inverse, mapping unit 416 may multiply the inverse by the transpose of matrix A. Subsequently, mapping unit 416 may solve for matrix h by multiplying by matrix b.

Mapping unit 416 may transform mask image 408A by applying the affine transformation matrix (eq. 1) to each point of mask image 408A, as shown below in (eq. 6). In other words, each pixel of transformed mask image 408A may be calculated by applying the affine transformation matrix to each pixel of original (e.g., not transformed) mask image 408A.

$$\begin{bmatrix} x_m^i \\ y_m^i \end{bmatrix} = \begin{bmatrix} h_1 & h_2 & h_3 \\ h_4 & h_5 & h_6 \end{bmatrix} \begin{bmatrix} x_p^i \\ y_p^i \\ 1 \end{bmatrix} \quad (\text{eq. 6})$$

Inspection region unit 418 may overlay (e.g., superimpose) the transformed mask image 408A on the corresponding reference image 409A. In some examples, after mask image 408A is superimposed on reference image 409A, transformed mask image 408A partially, but not completely covers reference image 409A. A portion of reference image 409A that is covered by transformed mask image 408A may define an inspection region (e.g., a region of the reference image that is intended for inspection by processing unit 400). In some examples, inspection region unit 418 overlays transformed mask image 408A on reference image 409A such that a centroid of transformed mask image 408A is aligned with a centroid of reference image 409A. In some such examples, an area of reference image 409A is larger than an area of transformed mask image 408A and the inspection region is an interior region of reference image 409A that is covered by transformed mask image 408A. In some examples, the inspection region includes an interior region of reference image 409A extending up to greater than about 10 micrometers and less than about 500 micrometers from a boundary of reference image 409A. Put another way, the inspection region includes an area of reference image 409A which excludes a boundary region of reference image 409A.

Quality unit 420 may process the inspection region of reference image 409A to determine the quality of the sheet part. For example, defect detection unit 422 may detect defects in the inspection region. Defects in the inspection region may include at least one of particles, scuffs, scratches, dents, streaks, and impressions. In some examples, defect detection unit 422 employs image processing techniques to calculate a defect quantification value based on at least one of a type of defect, number of defects, a size of defects, or a severity of defects. Based on the defect quantification value, quality evaluation unit 424 may classify reference image 409A into at least one of a defective category, a satisfactory category, or a rework category. Processing unit 400 may independently process each reference image (e.g., reference image 409A, 409B, 409C, . . . , and 409N) of the set of reference images 409 to determine the quality of the sheet part. More specifically, quality evaluation unit 424 may use a quality function to determine the quality of the sheet part. For example, the quality function may accept the defect quantification value of each reference image as inputs and produce the quality classification of the sheet part as an output. Processing unit 400 may determine a quality of each sheet part of the plurality of sheet parts 104 by analyzing a set of reference images 409 corresponding to each sheet part. In some examples, processing unit 400 is configured to determine the quality of the plurality of sheet parts 104 at a rate of about two sheet parts per second.

Figure 5:
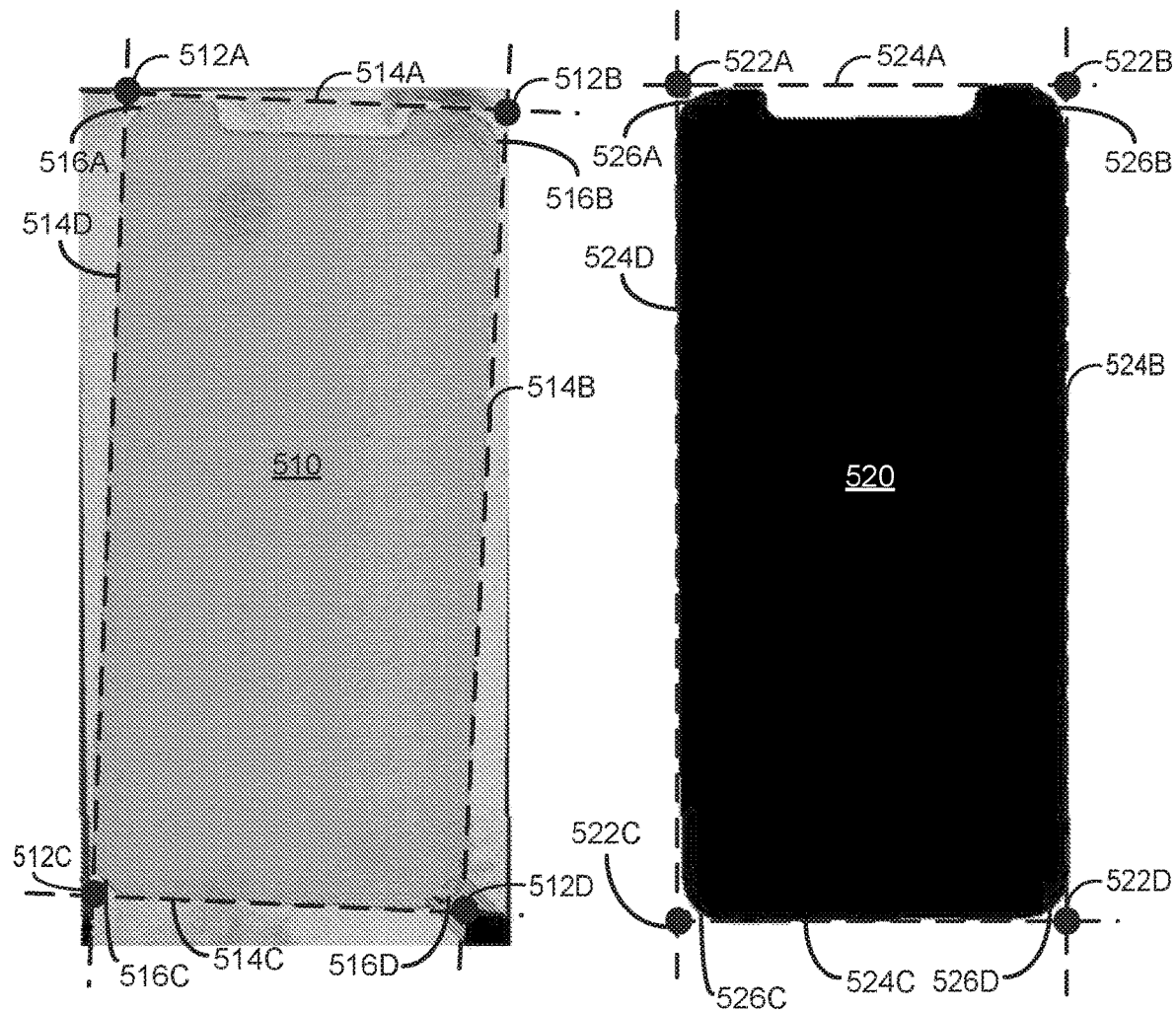
FIG. 5 is a block diagram illustrating a reference image having a plurality of identified primary points and a mask image having a plurality of identified secondary points, in accordance with at least one exemplary technique described in this disclosure.

FIG. 5 is a block diagram illustrating a reference image 510 having a plurality of identified primary points 512A-512D (collectively, "primary points 512") and a mask image 520 having a plurality of identified secondary points 522A-522D (collectively, "secondary points 522"), in accordance with at least one exemplary technique described in this disclosure. Reference image 510 may be an example of a reference image (e.g., reference image 409A) of the set of reference images 409 of FIG. 4 corresponding to a sheet part. In addition to primary points 512, reference image 510 may include primary edges 514A-514D (collectively, "primary edges 514") and primary rounded corners 516A-516D (collectively, "primary rounded corners 516"). Furthermore, mask image 520 may be an example of a mask image (e.g., mask image 408A) of the set of mask images 408 of FIG. 4. In addition to secondary points 522, mask image 520 may include secondary edges 524A-524D (collectively, "secondary edges 524") and secondary rounded corners 526A-526D (collectively, "secondary rounded corners 526").

A processing unit (e.g., processing unit 400 of FIG. 4) may identify primary points 512. As seen in the example of FIG. 5, processing unit 400 may identify the plurality of primary edges 514 in reference image 510. Primary edges 514 may include straight edges of a boundary of reference image 510. The straight edges of primary edges 514 may be connected by primary rounded corners 516. To identify primary points 512, processing unit 400 may extrapolate primary edges 514 such that primary edges 514 intersect at known coordinates. For example, as seen in FIG. 5, primary edge 514A and primary edge 514D may be extrapolated to intersect at primary point 512A. Processing unit 400 may identify the coordinates of primary point 512A, and the coordinates of each other primary point of primary points 512. The coordinates of primary points 512 may be used to transform mask image 520.

Additionally, processing unit 400 may identify secondary points 522. As seen in the example of FIG. 5, processing unit 400 may identify the plurality of secondary edges 524 in mask image 520. Secondary edges 524 may include straight edges of a boundary of mask image 520. The straight edges of secondary edges 524 may be connected by secondary rounded corners 526. To identify secondary points 522, processing unit 400 may extrapolate secondary edges 524 such that secondary edges 524 intersect at known coordinates. For example, secondary edge 524A and secondary edge 524D may be extrapolated to intersect at secondary point 522A. Processing unit 400 may identify the coordinates of secondary point 522A, and the coordinates of each other secondary point of secondary points 522. The coordinates of primary points 512 and the coordinates of secondary points 522 may be used as inputs to an affine transformation algorithm for transforming mask image 520 to adopt a shape and an orientation of reference image 510.

Figure 6:
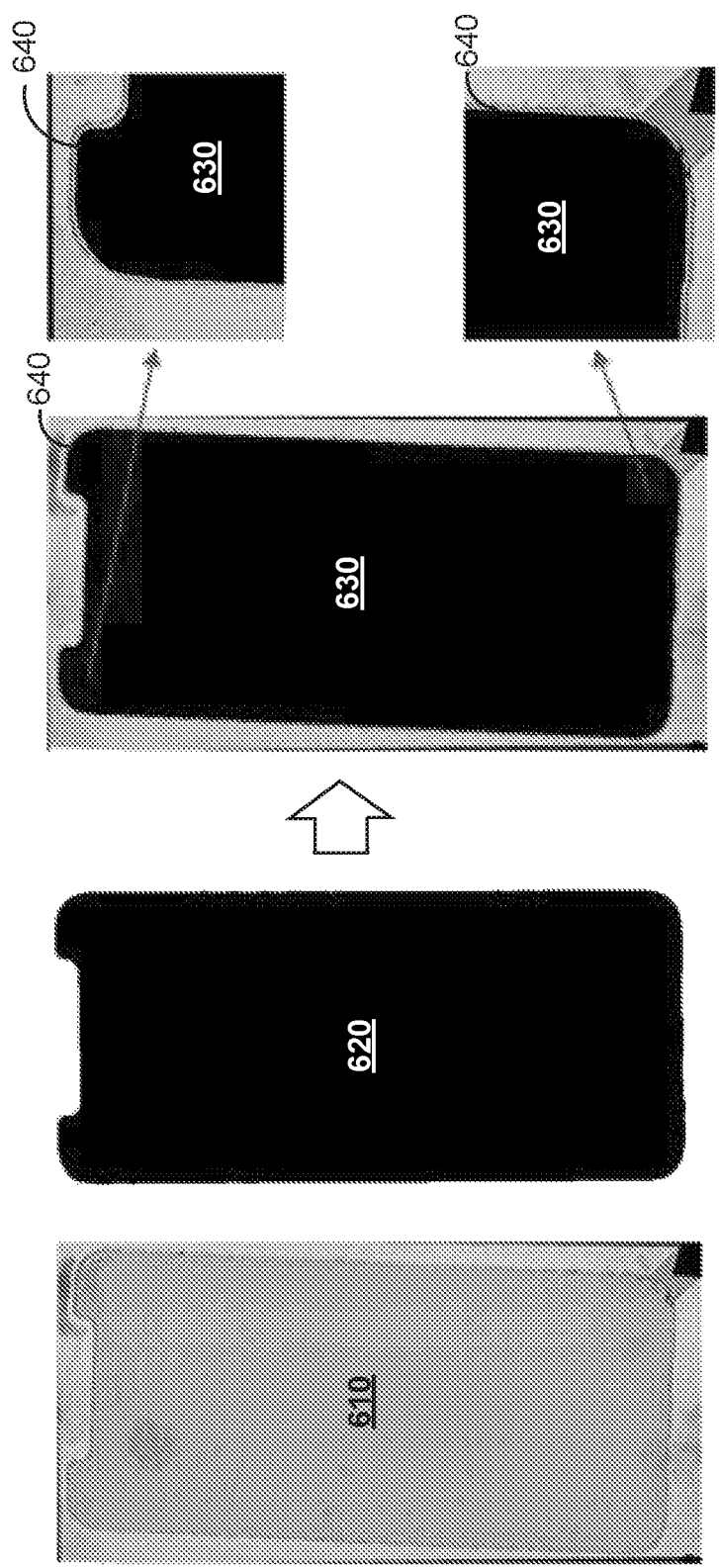
FIG. 6 is a block diagram illustrating a reference image, a corresponding mask image, and a boundary region created by applying a transformed mask image to a reference image, in accordance with at least one exemplary technique described in this disclosure.

FIG. 6 is a block diagram illustrating a reference image 610, a corresponding mask image 620, and a boundary region 640 created by applying a transformed mask image 630 to a reference image 610, in accordance with at least one exemplary technique described in this disclosure. Reference image 610 may be an example of a reference image (e.g., reference image 409A) of the set of reference images 409 of FIG. 4 corresponding to a sheet part. Furthermore, mask image 620 may be an example of a mask image (e.g., mask image 408A) of the set of mask images 408 of FIG. 4.

In some examples, a processing unit (e.g., processing unit 400 of FIG. 4) transforms mask image 620 into a transformed mask image 630. Prior to the transformation, a boundary of mask image 620 may be moved inward such that a size of mask image 620 is decreased and a shape of mask image 620 is maintained. Processing unit 400 may overlay the transformed mask image 630 on the reference image 610. The transformed mask image 630 partially covers the reference image. Processing unit 400 may define a boundary region 640 within the reference image 610, where the inspection region represents a portion of the reference image 610 that excludes the boundary region 640. In this way, the area of reference image 610 that is covered by mask image 630 represents the inspection region. The boundary region 640 encompasses an area extending between the boundary of reference image 610 and the boundary of mask image 630. In some examples, boundary region 640 extends greater than about 10 micrometers and less than about 500 micrometers from the boundary of reference image 610.

Figure 7:
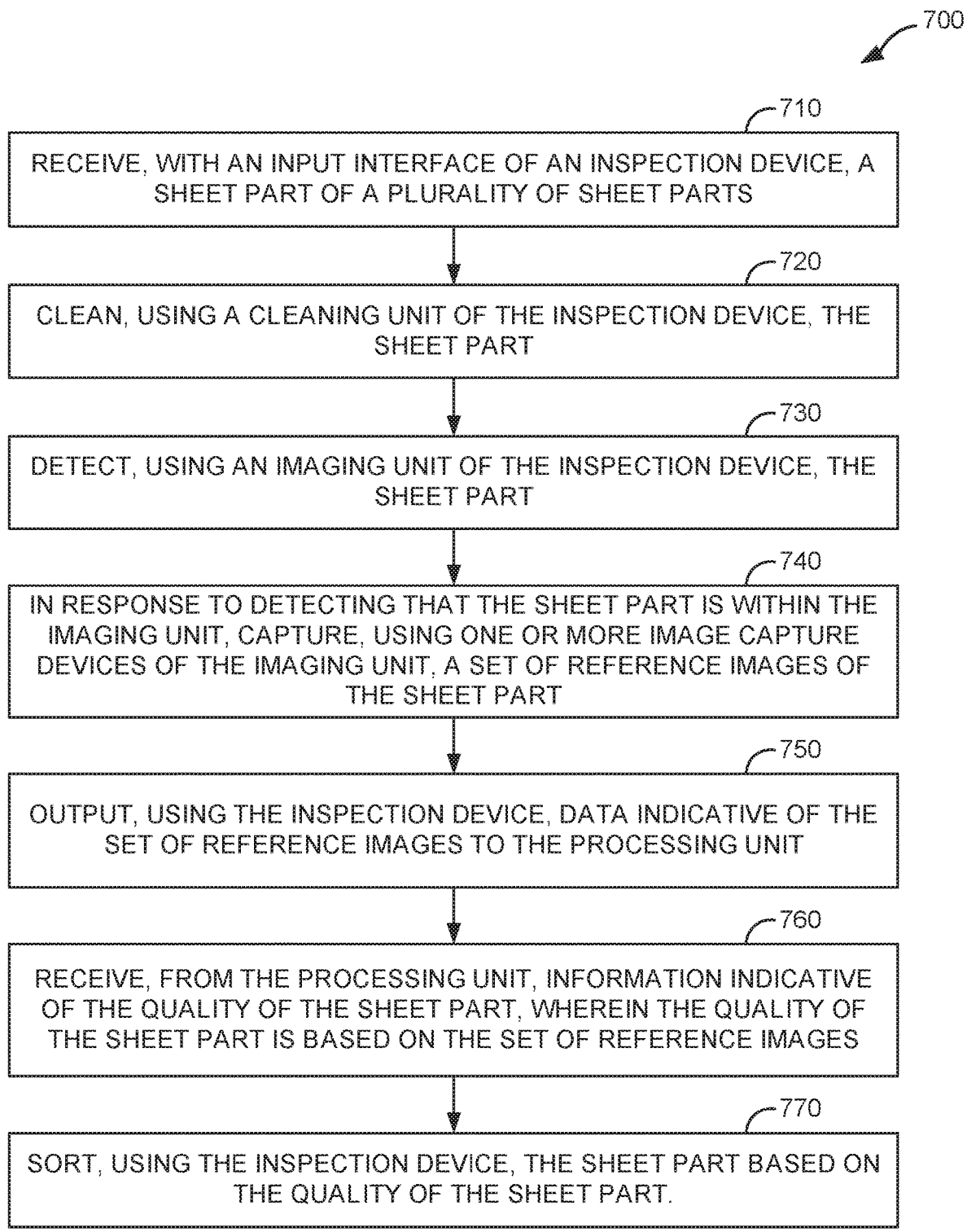
FIG. 7 is a flow diagram illustrating an example operation of capturing a set of reference images of a sheet part using an inspection device (e.g., the inspection device of FIG. 1) for determining a quality of the sheet part, in accordance with at least one exemplary technique described in this disclosure.

FIG. 7 is a flow diagram illustrating example operation 700 of capturing a set of reference images of a sheet part using an inspection device, such as inspection device 105 of system 100 of FIG. 1, for determining a quality of the sheet part, in accordance with at least one exemplary technique described in this disclosure. Example operation 700 is described with respect to system 100 of FIG. 1. However, example operation 700 should not be construed as being limited to system 100; example operation 700 may be performed by any element or group of elements configured to perform the steps of example operation 700.

According to example operation 700, an input zone of inspection device 105 receives a sheet part of a plurality of sheet parts 104 (710). In some examples, to receive the sheet part, inspection device 105 selects the sheet part from a stack of sheet parts and transfers the sheet part to the input zone. In order to select the sheet part, inspection device 105 may include a selection member configured to remove the sheet part from the stack of sheet parts and place the sheet part on the input zone. Additionally, or alternatively, to receive the sheet part, the system 100 may be configured to receive the sheet part from a device operator, where the device operator manually places the sheet part on the input zone. In some examples, the input zone of inspection device 105 includes a beginning of a moving belt that is configured to transport the sheet part from an endpoint of manufacturing process 102 through cleaning unit 106 and imaging unit 108.

Cleaning unit 106 of inspection device 105 may clean the sheet part (720). For example, cleaning unit 106 may remove particles (e.g., airborne particles, dust particles, or liquid droplets) from a surface of the sheet part as the sheet part travels to imaging unit 108. By cleaning the sheet part before imaging, cleaning unit 106 may prevent defects from being falsely detected in the set of reference images corresponding to the sheet part.

Imaging unit 108 of system 100 may detect the sheet part (730). In some examples, imaging unit 108 includes a light (not shown) and image capture devices 110, where the sheet part travels between the light and image capture devices 110. Consequently, in some such examples, image capture devices 110 may detect that the sheet part is partially obscuring the light as the sheet part passes between the light and image capture devices 110, and image capture devices 110 may thus determine that the sheet part is within imaging unit 108. In response to detecting that the sheet part is within the imaging unit, the at least one image capture device 110 capture a set of reference images of the sheet part (740).

Inspection device 105 outputs data indicative of the set of reference images to processing unit 120 (750). Processing unit 120 may analyze the set of reference images to determine a quality of the sheet part. After processing unit 120 determines the quality, system 100 receives, from processing unit 120, information indicative of the quality of the sheet part, where the quality of the sheet part is based on the set of reference images (760). Inspection device 105 sorts the sheet part based on the quality of the sheet part (770). In some examples, the information indicative of the quality of the sheet part includes a designation of at least one of plurality of quality of categories, the plurality of quality categories including a defective category, a satisfactory category, and a rework category.

Figure 8:
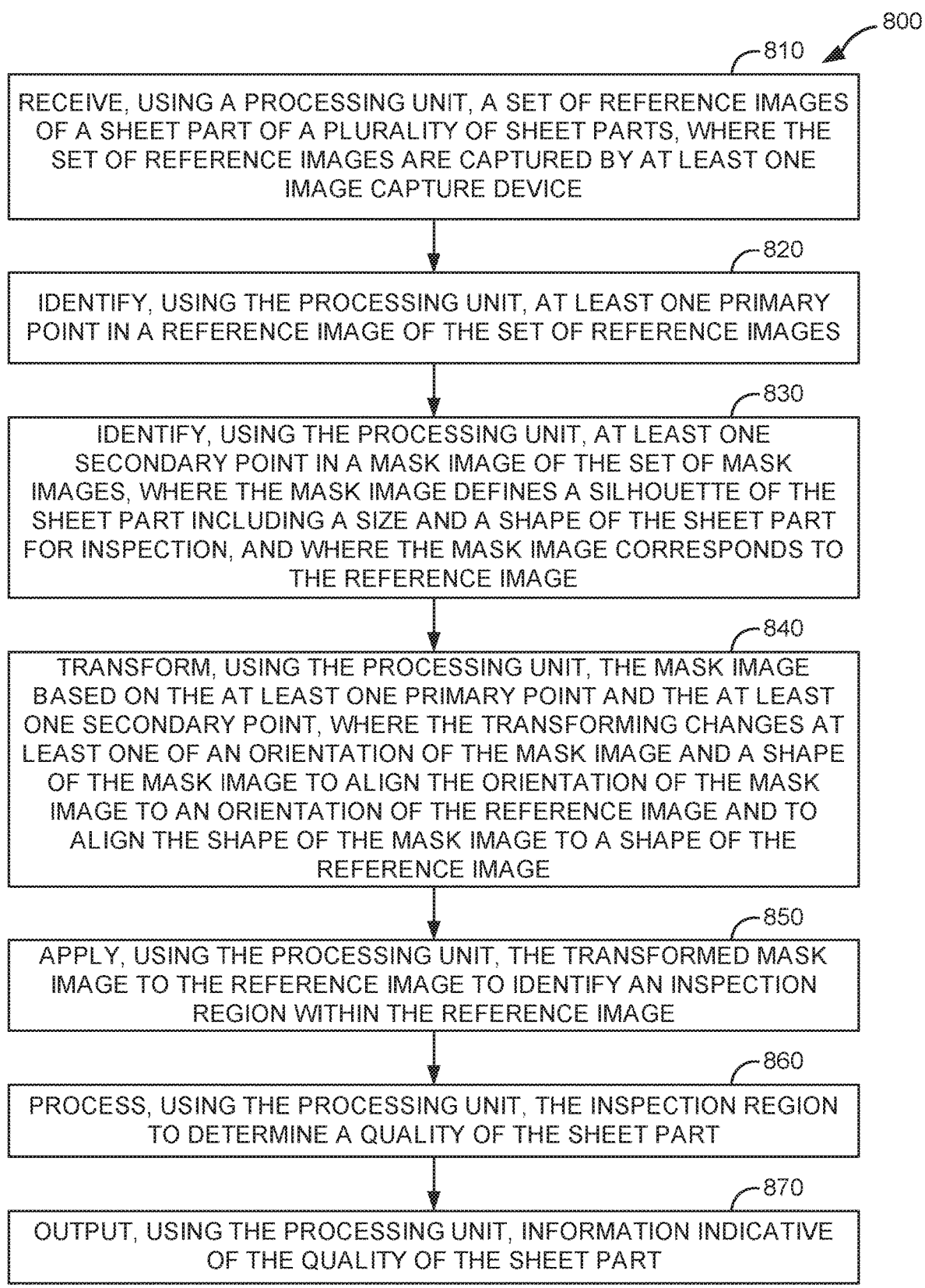
FIG. 8 is a flow diagram illustrating an example operation of determining a quality of a sheet part using a processing unit (e.g., such as the processing unit of FIG. 2) in accordance with at least one exemplary technique described in this disclosure.

FIG. 8 is a flow diagram illustrating example operation 800 of determining a quality of a sheet part using a processing unit, such as processing unit 400 of FIG. 4, in accordance with at least one exemplary technique described in this disclosure. Although example operation 800 is described with respect to processing unit 400 of FIG. 4, in other examples, example operation 800 may be performed by processing unit 120 within system 100 of FIG. 1.

According to example operation 800, processing unit 400 receives a set of reference images 409 of a sheet part of a plurality of sheet parts (e.g., sheet parts 104 of FIG. 1), where the set of reference images 409 are captured by at least one image capture device (e.g., image capture devices 110 of FIG. 1) (810). In example operation 800, the set of reference images 409 received by processing unit 400 may include a reference image corresponding to each image capture device of image capture devices 110. In some examples, processing unit 400 receives the set of reference images 409 via a wireless connection at interfaces 404. Additionally, or alternatively, interfaces 404 of processing unit 400 may be electrically connected to system 100 such that processing unit 400 may receive the set of reference images 409 via an electrical conductor.

Transformation unit 410 of processing unit 400 identifies at least one primary point in a reference image (e.g., reference image 409A) of the set of reference images 409 (820). Additionally, transformation unit 410 identifies at least one secondary point in a mask image (e.g., mask image 408A) of a set of mask images 408, where the mask image 408A defines a silhouette of the sheet part including a size and a shape of the sheet part for inspection, and where the mask image 408A corresponds to the reference image 409A (830). More specifically, to identify the at least one primary point, point detection unit 412 of transformation unit 410 may identify a plurality of primary edges in reference image 409A. Each primary point of the at least one primary point represents an intersection between a pair of primary edges of the plurality of primary edges. Additionally, to identify the at least one secondary point, point detection unit 412 may identify a plurality of secondary edges in the mask image 408A, wherein each secondary point of the at least one secondary point represents an intersection between a pair of secondary edges of the plurality of secondary edges. In some examples, after point detection unit 412 identifies the at least one primary point and the at least one secondary point, mask alteration unit 414 of transformation unit 410 crops the mask image 408A (e.g., decreasing a size of the mask image 408A while maintaining a shape of the mask image 408A).

Once point detection unit 412 identifies the at least one primary point and the at least one secondary point, mapping unit 416 of transformation unit 410 may transform the mask image 408A based on the at least one primary point and the at least one secondary point, where the transforming changes at least one of an orientation of the mask image 408A and a shape of the mask image 408A to align the orientation of the mask image 408A to an orientation of the reference image 409A and to align the shape of the mask image 408A to a shape of the reference image 409A (840). In some examples, mapping unit 416 transforms the mask image 408A using an affine transformation algorithm. In general, the affine transformation algorithm maps a first affine space to a second affine space. Parallel lines remain parallel in the transformation between the first affine space and the second affine space. However, intersection angles between lines may change in the transformation between the first affine space and the second affine space. In the case of example operation 800, the first affine space includes mask image 408A, and the second affine space includes a transformed mask image 408A. More specifically, the affine transformation algorithm includes an affine transformation matrix composed of a set of values, where the affine transformation matrix is designed to create the transformed mask image 408A which adopts an orientation and a shape of the respective reference image 409A.

After mapping unit 416 creates the transformed mask image 408A, mapping unit 416 applies the transformed mask image 408A to the respective reference image 409A to identify an inspection region within the reference image 409A (850). For example, mapping unit 416 may overlay the transformed mask image 408A on the reference image, the transformed mask image 408A partially covering the reference image. Mapping unit 416 may define the inspection region within the reference image 409A as a portion of the reference image 409A that is covered by the transformed mask image 408A. In this way, the inspection region defines an interior region of reference image 409A extending to a predetermined distance from the boundary of the reference image 409A. In some examples, the predetermined distance is greater than about 10 micrometers and less than about 500 micrometers. In one example, the inspection region defines the interior region of reference image 409A, where the interior region defines an area extending to greater than 15 micrometers and less than 25 micrometers from a boundary of reference image 409A.

Quality unit 420 of processing unit 400 may assess the inspection region of the reference image 409A for defects. In example operation 800, quality unit 420 may process the inspection region to determine a quality of the sheet part (860). More specifically, quality unit 420 may be configured to determine the quality of the sheet part by detecting defects in the inspection region. Example defects may include at least one of particles, scuffs, scratches, dents, streaks, and impressions that may be detected by defect detection unit 422 of quality unit 420 using image processing techniques. Quality evaluation unit 424 of quality unit 420 may quantify detected defects based on any combination of a number of detected defects, a size of detected defects, or a severity of detected defects. Based on the quantification of the detected defects, quality evaluation unit 424 may determine the quality of the sheet part by classifying the sheet part into at least one of a satisfactory category, a defective category, or a rework category. Processing unit 400 outputs information indicative of the quality of the sheet part (870). In some examples, processing unit 400 outputs the information to inspection device 105 of FIG. 1 via interfaces 404.

Although example operation 800 is described with respect to mask image 408A and reference image 409A, example operation 800 may additionally be applied using other mask images and reference images. For example, processing unit 400 may independently process each reference image (e.g., reference image 409A, 409B, 409C, . . . , and 409N) of the set of reference images 409 to determine the quality of the sheet part. Additionally, processing unit 400 may determine a quality of each sheet part of the plurality of sheet parts 104 by analyzing a set of reference images 409 corresponding to each sheet part.

the techniques described in this disclosure may be implemented, at least in part, in hardware, software, firmware or any combination thereof. For example, various aspects of the described techniques may be implemented within at least one processor, including at least one microprocessor, DSP, ASIC, FPGA, and/or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform at least one of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with at least one module and/or unit may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method (e.g., when the instructions are executed). Computer readable storage media may include random access memory (RAM), read only memory (ROM), programmable read only memory (PROM), EPROM, EEPROM, flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

EXEMPLARY EMBODIMENTS

1A. A system for determining a quality of each of a plurality of sheet parts produced by a manufacturing facility, the system comprising
an inspection device comprising at least one image capture device, the at least one image capture device configured to capture a set of reference images of a sheet part of the plurality of sheet parts; and
a processing unit configured to:
identify at least one primary point in a reference image of the set of reference images;
identify at least one secondary point in a mask image of a set of mask images, wherein the mask image defines a silhouette of the sheet part including a size and a shape of the sheet part for inspection, and wherein the mask image corresponds to the reference image;
transform the mask image based on the at least one primary point and the at least one secondary point, wherein the transforming changes at least one of an orientation of the mask image or a shape of the mask image to align the orientation of the mask image to an orientation of the reference image and to align the shape of the mask image to a shape of the reference image;
apply the transformed mask image to the reference image to identify an inspection region within the reference image;
process the inspection region of the reference image to determine the quality of the sheet part; and
output information indicative of the quality of the sheet part.

2A. The system of Exemplary Embodiment 1A, wherein to apply the transformed mask image to the reference image to identify the inspection region within the reference image the processing unit is configured to:
overlay the transformed mask image on the reference image, the transformed mask image partially covering the reference image; and
define the inspection region within the reference image, wherein the inspection region represents an interior portion of the reference image that is covered by the transformed mask image, and
wherein the processing unit is configured to determine the quality of the sheet part by detecting defects in the inspection region.

3A. The system of Exemplary Embodiment 2A, wherein the defects in the inspection region comprise at least one of particles, scuffs, scratches, dents, streaks, or impressions.

4A. The system of any of Exemplary Embodiments 1A to 3A, wherein the processing unit is configured to transform the mask image using an affine transformation algorithm.

5A. The system of any of Exemplary Embodiments 1A to 4A, wherein the processing unit is configured to determine the quality of the sheet part by classifying the sheet part into at least one of a satisfactory category, a defective category, or a rework category.

6A. The system of any of Exemplary Embodiments 1A to 5A, wherein the inspection region includes an interior portion of the reference image, and wherein the interior portion defines an area extending to greater than 15 micrometers and less than 25 micrometers from a boundary of the reference image.

7A. The system of any of Exemplary Embodiments 1A to 6A, wherein the processing unit is configured to identify the at least one primary point by identifying a plurality of primary edges in the reference image, and wherein each primary point of the at least one primary point represents an intersection between a pair of primary edges of the plurality of primary edges.

8A. The system of Exemplary Embodiment 7A, wherein the processing unit is configured to identify the at least one secondary point by identifying a plurality of secondary edges in the mask image, and wherein each secondary point of the at least one secondary point represents an intersection between a pair of secondary edges of the plurality of secondary edges.

9A. The system of any of Exemplary Embodiments 1A to 8A, wherein the at least one image capture device comprises a plurality of image capture devices, wherein each image capture device of the plurality of image capture devices is configured to capture a reference image of the sheet part, and wherein the processing unit is configured to independently determine the quality of the sheet part based on the reference image captured by each respective image capture device.

10A. The system of any of Exemplary Embodiments 1A to 9A, wherein the inspection device further comprises a user interface, and wherein the processing unit is further configured to create the mask image based on an input received by the user interface.

11A. The system of any of Exemplary Embodiments 1A to 10A, wherein the inspection device is configured to:
receive, with the inspection device, the sheet part of the plurality of sheet parts;
clean, using at least one cleaning unit of the inspection device, the sheet part;
detect that the sheet part is within an imaging unit of the inspection device;
in response to detecting that the sheet part is within the imaging unit, capture, using at least one image capture device of the imaging unit, the set of reference images of the sheet part;
output, using an interface module of the inspection device, data indicative of the set of reference images to the processing unit;
receive, from the processing unit, the information indicative of the quality of the sheet part, wherein the quality of the sheet part is based on the set of reference images; and
sort, using the inspection device, the sheet part based on the quality of the sheet part.

12A. The system of Exemplary Embodiment 11A, wherein to receive the sheet part, the inspection device is configured to:
select the sheet part from a stack of sheet parts of the plurality of sheet parts; and
transfer the sheet part to an input zone of the inspection device.

13A. The system of any of Exemplary Embodiments 11A or 12A, wherein to receive the sheet part, the inspection device is configured to receive the sheet part from a device operator, and wherein the device operator manually places the sheet part on an input zone of the inspection device.

14A. The system of any of Exemplary Embodiments 1A to 13A, wherein the system is configured to determine the quality of the plurality of sheet parts at a rate of about two sheet parts per second.

15A. The system of any of Exemplary Embodiments 1A to 14A, wherein the sheet part comprises an optical film.

16A. The system of any of Exemplary Embodiments 1A to 15A, wherein the sheet part comprises an optically clear adhesive.

17A. The system of any of Exemplary Embodiments 1A to 16A, wherein the processing unit comprises at least one computing device, each computing device having a memory and at least one processor.

1B. A processing unit configured to:
- receive a set of reference images of a sheet part of a plurality of sheet parts, wherein the set of reference images are captured by at least one image capture device;
- identify at least one primary point in a reference image of the set of reference images;
- identify at least one secondary point in a mask image of a set of mask images, wherein the mask image defines a silhouette of the sheet part including a size and a shape of the sheet part for inspection, and wherein the mask image corresponds to the reference image;
- transform the mask image based on the at least one primary point and the at least one secondary point, wherein the transforming changes at least one of an orientation of the mask image or a shape of the mask image to align the orientation of the mask image to an orientation of the reference image and to align the shape of the mask image to a shape of the reference image;
- apply the transformed mask image to the reference image to identify an inspection region within the reference image;
- process the inspection region of the reference image to determine a quality of the sheet part; and
- output information indicative of the quality of the sheet part.

2B. The processing unit of Exemplary Embodiment 1B, wherein, to apply the transformed mask image to the reference image to identify an inspection region within the reference image, the processing unit is configured to:
- overlay the transformed mask image on the reference image, the transformed mask image partially covering the reference image; and
- define the inspection region within the reference image, wherein the inspection region represents an interior portion of the reference image that is covered by the transformed mask image, and
- wherein the processing unit is configured to determine the quality of the sheet part by detecting defects in the inspection region.

3B. The processing unit of either Exemplary Embodiment 1B or 2B, wherein, to transform the mask image, the processing unit is configured to transform the mask image using an affine transformation algorithm.

4B. The processing unit of any of Exemplary Embodiments 1B to 3B, wherein, to determine the quality of the sheet part, the processing unit is configured to classify the sheet part into at least one of a satisfactory category, a defective category, or a rework category.

5B. The processing unit of any of Exemplary Embodiments 1B to 4B, wherein the inspection region includes an interior portion of the reference image, and wherein the interior portion defines an area extending to greater than 15 micrometers and less than 25 micrometers from a boundary of the reference image.

6B. The processing unit of any of Exemplary Embodiments 2B to 5B, wherein the defects in the inspection region comprise at least one of particles, scuffs, scratches, dents, streaks, or impressions.

7B. The processing unit of any of Exemplary Embodiments 1B to 6B, wherein to identify the at least one primary point, the processing unit is configured to identify a plurality of primary edges in the reference image, and wherein each primary point of the at least one primary point represents an intersection between a pair of primary edges of the plurality of primary edges.

8B. The processing unit of Exemplary Embodiment 7B, wherein to identify the at least one secondary point, the processing unit is configured to identify a plurality of secondary edges in the mask image, and wherein each secondary point of the at least one secondary point represents an intersection between a pair of secondary edges of the plurality of secondary edges.

9B. The processing unit of any of Exemplary Embodiments 1B to 8B, wherein the processing unit is configured to receive a reference image of the sheet part captured by each image capture device of a plurality of image capture devices, and wherein the processing unit is configured to independently determine the quality of the sheet part based on the reference image captured by each respective image capture device.

10B. The processing unit of any of Exemplary Embodiments 1B to 9B, wherein the processing unit is further configured to receive the mask image from the inspection device, and wherein the mask image is created based on an input received by a user interface of the inspection device.

11B. The processing unit of any of Exemplary Embodiments 1B to 10B, wherein the processing unit is configured to determine the quality of the plurality of sheet parts at a rate of about two sheet parts per second.

12B. The processing unit of any of Exemplary Embodiments 1B to 11B, wherein the sheet part comprises an optical film.

13B. The processing unit of any of Exemplary Embodiments 1B to 12B, wherein the sheet part comprises an optically clear adhesive.

14B. The processing unit of any of Exemplary Embodiments 1B to 13B, wherein the processing unit comprises at least one computing device, each computing device having a memory and at least one processor.

1C. A method comprising:
- capturing, using at least one image capture device of an inspection system, a set of reference images of a sheet part of a plurality of sheet parts;
- identifying, using a processing unit, at least one primary point in a reference image of the set of reference images;
- identifying, using the processing unit, at least one secondary point in a mask image of a set of mask images, wherein the mask image defines a silhouette of the sheet part including a size and a shape of the sheet part for inspection, and wherein the mask image corresponds to the reference image;
- transforming, using the processing unit, the mask image based on the at least one primary point and the at least one secondary point, wherein the transforming changes at least one of an orientation of the mask image or a shape of the mask image to align the orientation of the mask image to an orientation of the reference image and to align the shape of the mask image to a shape of the reference image;

applying, using the processing unit, the transformed mask image to the reference image to identify an inspection region within the reference image;

processing, using the processing unit, the inspection region of the reference image to determine a quality of the sheet part; and outputting, using the processing unit, information indicative of the quality of the sheet part.

2C. The method of Exemplary Embodiment 1C, wherein applying the transformed mask image to the reference image to identify an inspection region within the reference image comprises:

overlaying the mask image on the reference image, the mask image partially covering the reference image; and defining the inspection region within the reference image, wherein the inspection region represents an interior portion of the reference image that is covered by the transformed mask image, and wherein processing the inspection region of the reference image to determine a quality of the sheet part comprises detecting defects in the inspection region.

3C. The method of either Exemplary Embodiment 1C or 2C, wherein transforming the mask image comprises transforming the mask image using an affine transformation algorithm.

4C. The method of any of Exemplary Embodiments 1C to 3C, wherein processing the inspection region of the reference image to determine a quality of the sheet part comprises classifying the sheet part into at least one of a satisfactory category, a defective category, or a rework category.

5C. The method of any of Exemplary Embodiments 1C to 4C, wherein identifying the at least one primary point comprises identifying a plurality of primary edges in the reference image, and wherein each primary point of the at least one primary point represents an intersection between a pair of primary edges of the plurality of primary edges.

6C. The method of Exemplary Embodiment 5C, wherein identifying the at least one secondary point comprises identifying a plurality of secondary edges in the mask image, and wherein each secondary point of the at least one secondary point represents an intersection between a pair of secondary edges of the plurality of secondary edges.

7C. The method of any of Exemplary Embodiments 1C to 6C, wherein capturing the reference image of the sheet part comprises capturing, with each image capture device of a plurality of image capture devices, a reference image of the sheet part, wherein the processing unit is configured to independently determine the quality of the sheet part based on the reference image captured by each respective image capture device.

8C. The method of any of Exemplary Embodiments 1C to 7C, further comprising creating, using a user interface of the inspection device, the mask image based on an input to the user interface.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A system for determining a quality of each of a plurality of sheet parts produced by a manufacturing facility, the system comprising:

an inspection device comprising at least one image capture device, the at least one image capture device configured to capture a set of reference images of a sheet part of the plurality of sheet parts; and a processing unit configured to:
identify at least one primary point in a reference image of the set of reference images;

identify at least one secondary point in a mask image of a set of mask images, wherein the mask image is a binary image and defines a silhouette of the sheet part including a size and a shape of the sheet part for inspection, and wherein the mask image corresponds to the reference image;

transform the mask image based on the at least one primary point and the at least one secondary point, wherein the transforming changes at least one of an orientation of the mask image or a shape of the mask image to align the orientation of the mask image to an orientation of the reference image or to align the shape of the mask image to a shape of the reference image;

apply the transformed mask image to the reference image to identify an inspection region within the reference image;

process the inspection region of the reference image to determine the quality of the sheet part; and output information indicative of the quality of the sheet part.

2. The system of claim 1, wherein to apply the transformed mask image to the reference image to identify the inspection region within the reference image the processing unit is configured to:

overlay the transformed mask image on the reference image, the transformed mask image partially covering the reference image; and define the inspection region within the reference image, wherein the inspection region represents an interior portion of the reference image that is covered by the transformed mask image, and wherein the processing unit is configured to determine the quality of the sheet part by detecting defects in the inspection region.

3. The system of claim 1, wherein the processing unit is configured to transform the mask image using an affine transformation algorithm.

4. The system of claim 1, wherein the processing unit is configured to determine the quality of the sheet part by classifying the sheet part into at least one of a satisfactory category, a defective category, or a rework category.

5. The system of claim 1, wherein the processing unit is configured to identify the at least one primary point by identifying a plurality of primary edges in the reference image, and wherein each primary point of the at least one primary point represents an intersection between a pair of primary edges of the plurality of primary edges.

6. The system of claim 5, wherein the processing unit is configured to identify the at least one secondary point by identifying a plurality of secondary edges in the mask image, and wherein each secondary point of the at least one secondary point represents an intersection between a pair of secondary edges of the plurality of secondary edges.

7. The system of claim 1, wherein the at least one image capture device comprises a plurality of image capture devices, wherein each image capture device of the plurality of image capture devices is configured to capture a reference image of the sheet part, and wherein the processing unit is configured to independently determine the quality of the sheet part based on the reference image captured by each respective image capture device.

8. The system of claim 1, wherein the inspection device further comprises a user interface, and wherein the processing unit is further configured to create the mask image based on an input received by the user interface.

9. The system of claim 1, wherein the inspection device is configured to:
receive, with the inspection device, the sheet part of the plurality of sheet parts;
clean, using at least one cleaning unit of the inspection device, the sheet part;
detect that the sheet part is within an imaging unit of the inspection device;
in response to detecting that the sheet part is within the imaging unit, capture, using at least one image capture device of the imaging unit, the set of reference images of the sheet part;
output, using an interface module of the inspection device, data indicative of the set of reference images to the processing unit;
receive, from the processing unit, the information indicative of the quality of the sheet part, wherein the quality of the sheet part is based on the set of reference images; and
sort, using the inspection device, the sheet part based on the quality of the sheet part.

10. The system of claim 9, wherein to receive the sheet part, the inspection device is configured to:
select the sheet part from a stack of sheet parts of the plurality of sheet parts; and
transfer the sheet part to an input zone of the inspection device.

11. The system of claim 10, wherein to receive the sheet part, the inspection device is configured to receive the sheet part from a device operator, and wherein the device operator manually places the sheet part on an input zone of the inspection device.

12. A processing unit configured to:
receive a set of reference images of a sheet part of a plurality of sheet parts, wherein the set of reference images are captured by at least one image capture device;
identify at least one primary point in a reference image of the set of reference images;
identify at least one secondary point in a mask image of a set of mask images, wherein the mask image defines a silhouette of the sheet part including a size and a shape of the sheet part for inspection, and wherein the mask image is a binary image and corresponds to the reference image;
transform the mask image based on the at least one primary point and the at least one secondary point, wherein the transforming changes at least one of an orientation of the mask image or a shape of the mask image to align the orientation of the mask image to an orientation of the reference image and to align the shape of the mask image to a shape of the reference image, apply the transformed mask image to the reference image to identify an inspection region within the reference image;
process the inspection region of the reference image to determine a quality of the sheet part; and
output information indicative of the quality of the sheet part.

13. The processing unit of claim 12, wherein, to apply the transformed mask image to the reference image to identify an inspection region within the reference image, the processing unit is configured to:
overlay the transformed mask image on the reference image, the transformed mask image partially covering the reference image; and
define the inspection region within the reference image, wherein the inspection region represents an interior portion of the reference image that is covered by the transformed mask image, and
wherein the processing unit is configured to determine the quality of the sheet part by detecting defects in the inspection region.

14. The processing unit of claim 12, wherein, to transform the mask image, the processing unit is configured to transform the mask image using an affine transformation algorithm.

15. The processing unit of claim 12, wherein to determine the quality of the sheet part, the processing unit is configured to classify the sheet part into at least one of a satisfactory category, a defective category, or a rework category.

16. The processing unit of claim 12, wherein to identify the at least one primary point, the processing unit is configured to identify a plurality of primary edges in the reference image, and wherein each primary point of the at least one primary point represents an intersection between a pair of primary edges of the plurality of primary edges.

17. The processing unit of claim 16, wherein to identify the at least one secondary point, the processing unit is configured to identify a plurality of secondary edges in the mask image, and wherein each secondary point of the at least one secondary point represents an intersection between a pair of secondary edges of the plurality of secondary edges.

18. The processing unit of claim 12, wherein the processing unit is configured to receive a reference image of the sheet part captured by each image capture device of a plurality of image capture devices, and wherein the processing unit is configured to independently determine the quality of the sheet part based on the reference image captured by each respective image capture device.

19. The processing unit of claim 12, wherein the processing unit is further configured to receive the mask image from the inspection device, and wherein the mask image is created based on an input received by a user interface of the inspection device.

20. A method comprising:
capturing, using at least one image capture device of an inspection system, a set of reference images of a sheet part of a plurality of sheet parts;
identifying, using a processing unit, at least one primary point in a reference image of the set of reference images;
identifying, using the processing unit, at least one secondary point in a mask image of a set of mask images, wherein the mask image is a binary image and defines a silhouette of the sheet part including a size and a shape of the sheet part for inspection, and wherein the mask image corresponds to the reference image;
transforming, using the processing unit, the mask image based on the at least one primary point and the at least one secondary point, wherein the transforming changes at least one of an orientation of the mask image or a shape of the mask image to align the orientation of the mask image to an orientation of the reference image and to align the shape of the mask image to a shape of the reference image;

applying, using the processing unit, the transformed mask image to the reference image to identify an inspection region within the reference image;

processing, using the processing unit, the inspection region of the reference image to determine a quality of the sheet part; and outputting, using the processing unit, information indicative of the quality of the sheet part.

* * * * *